(12) United States Patent
Araki et al.

(10) Patent No.: US 10,487,249 B2
(45) Date of Patent: Nov. 26, 2019

(54) ADHESIVE COMPOSITION AND PRESSURE-SENSITIVE ADHESIVE TAPE

(71) Applicant: Asahi Kasei Kabushiki Kaisha, Tokyo (JP)

(72) Inventors: Yoshifumi Araki, Tokyo (JP); Kosuke Nakatani, Tokyo (JP); Shigeo Nakajima, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 687 days.

(21) Appl. No.: 15/111,910

(22) PCT Filed: Jan. 22, 2015

(86) PCT No.: PCT/JP2015/051734
§ 371 (c)(1),
(2) Date: Jul. 15, 2016

(87) PCT Pub. No.: WO2015/111674
PCT Pub. Date: Jul. 30, 2015

(65) Prior Publication Data
US 2019/0153273 A1 May 23, 2019

(30) Foreign Application Priority Data

Jan. 23, 2014 (JP) .................. 2014-010804
Jan. 23, 2014 (JP) .................. 2014-010805

(51) Int. Cl.
*C09J 153/02* (2006.01)
*C09J 11/06* (2006.01)
*C09J 7/38* (2018.01)

(52) U.S. Cl.
CPC ........... *C09J 153/025* (2013.01); *C09J 11/06* (2013.01); *C09J 7/387* (2018.01)

(58) Field of Classification Search
CPC .................................................. C09J 153/025
See application file for complete search history.

(56) References Cited

U.S. PATENT DOCUMENTS

| | | | |
|---|---|---|---|
| 4,411,954 A | 10/1983 | Butch, III et al. | |
| 4,994,508 A | 2/1991 | Shiraki et al. | |
| 5,639,831 A * | 6/1997 | Himes ................ | C08F 297/044 |
| | | | 428/343 |
| 2002/0147274 A1 | 10/2002 | Sasagawa et al. | |
| 2012/0016086 A1* | 1/2012 | Kasper .................... | C08L 23/08 |
| | | | 525/232 |
| 2012/0067393 A1* | 3/2012 | Higashidate .............. | B32B 7/12 |
| | | | 136/244 |
| 2013/0101927 A1 | 4/2013 | Taneichi et al. | |
| 2014/0199908 A1 | 7/2014 | Inoue | |
| 2015/0045488 A1 | 2/2015 | Takenaka | |

FOREIGN PATENT DOCUMENTS

| | | |
|---|---|---|
| JP | S59-049277 A | 3/1984 |
| JP | S61-278578 A | 12/1986 |
| JP | S64-020284 A | 1/1989 |
| JP | S64-081877 A | 3/1989 |
| JP | H04-153288 A | 5/1992 |
| JP | H104-246488 A | 9/1992 |
| JP | H06-145626 A | 5/1994 |
| JP | H07-157738 A | 6/1995 |
| JP | H08-073521 A | 3/1996 |
| JP | 2012-126822 A | 7/2012 |
| JP | 2013-064056 A | 4/2013 |
| JP | 2013-227459 A | 11/2013 |
| WO | 2001/085818 A1 | 11/2001 |
| WO | 2012/004951 A1 | 1/2012 |

OTHER PUBLICATIONS

International Search Report issued in corresponding International Patent Application No. PCT/JP2015/051734 dated Apr. 21, 2015.
European Search Report issued in corresponding European Patent Application No. 15740132.4 dated Nov. 24, 2016.
International Preliminary Report on Patentability and Written Opinion issued in corresponding International Patent Application No. PCT/JP2015/051734 dated Jul. 26, 2016.

* cited by examiner

Primary Examiner — Jeffrey C Mullis
(74) Attorney, Agent, or Firm — Morgan, Lewis & Bockius LLP

(57) ABSTRACT

The adhesive composition according to the invention of the present application contains a block copolymer (a) having a block mainly comprising a vinyl aromatic monomer unit, a tackifier (b) and an oil (c), in which the block copolymer (a) contains a partially hydrogenated block copolymer (a-1), the partially hydrogenated block copolymer (a-1) has a vinyl aromatic monomer unit and a conjugated diene monomer unit, the content of the vinyl aromatic monomer unit is 10 mass % or more and 19 mass % or less based on 100 mass % of the partially hydrogenated block copolymer (a-1), and the hydrogenation ratio of double bonds contained in the conjugated diene monomer unit in the partially hydrogenated block copolymer (a-1) is 15 mol % or more and less than 80 mol % based on the total (amount) of double bonds before hydrogenation.

17 Claims, No Drawings

ADHESIVE COMPOSITION AND PRESSURE-SENSITIVE ADHESIVE TAPE

TECHNICAL FIELD

The present invention relates to an adhesive composition and a pressure-sensitive adhesive tape.

BACKGROUND ART

Recently, hot-melt type adhesives have been widely used in view of improvement of environmental pollution and working environment. As a polymer for use in the hot-melt type adhesives, a styrene-based block copolymer is widely used.

Patent Literatures 1 and 2 propose adhesive compositions using a triblock copolymer and a diblock copolymer as a styrene-based block copolymer.

Patent Literature 3 proposes adhesive compositions using styrene-based block copolymers different in hydrogenation ratio, and discloses adhesive compositions containing a hydrogenated styrene-based block copolymer having a vinyl aromatic monomer content of 0 mass % or 20 mass % or more, a tackifier and an oil in different mixing ratios, in Examples and Comparative Examples thereof.

An adhesive composition to be used in an adhesive tape is required to have a balance between properties such as high ball tack, high tack strength, high retentivity, high coating property, color fastness, high runoff resistance from the edge of a laminate.

CITATION LIST

Patent Literatures

Patent Literature 1: Japanese Patent Laid-Open No. S64-81877
Patent Literature 2: Japanese Patent Laid-Open No. S61-278578
Patent Literature 3: WO2001/85818

SUMMARY OF INVENTION

Technical Problem

The adhesive compositions disclosed in Patent Literatures 1 to 3 mentioned above have properties required for an adhesive composition but not sufficient properties and are required to further improve a balance among properties such as high ball tack, high tack strength, high retentivity, high coating property, color fastness and high runoff resistance from the edge upon lamination.

The present invention was made in consideration of the aforementioned problems and directed to providing an adhesive composition excellent in ball tack, tack strength, retentivity, coating property, color fastness, runoff resistance from the edge of a laminate, and providing pressure-sensitive adhesive tape and label having the adhesive composition.

Solution to Problem

The present inventors made intensive studies with a view to solving problems in the prior art. As a result, they have found that the problems in the prior art can be solved by an adhesive composition having a predetermined partially hydrogenated block copolymer, an oil and a tackifier in a predetermined ratio, and accomplished the present invention.

More specifically, the present invention is as follows.

[1]

An adhesive composition comprising a block copolymer (a) having a block mainly comprising a vinyl aromatic monomer unit, a tackifier (b) and an oil (c), wherein the block copolymer (a) comprises a partially hydrogenated block copolymer (a-1);

the partially hydrogenated block copolymer (a-1) has a vinyl aromatic monomer unit and a conjugated diene monomer unit;

a content of the vinyl aromatic monomer unit is 10 mass % or more and 19 mass % or less based on 100 mass % of the partially hydrogenated block copolymer (a-1);

a hydrogenation ratio of double bonds contained in the conjugated diene monomer unit in the partially hydrogenated block copolymer (a-1) is 15 mol % or more and less than 80 mol % based on a total (amount) of double bonds before hydrogenation;

when a ratio (P/O), which is a ratio of a content (P) of the block copolymer (a) to a content (O) of the oil (c), is 0.7 or more and less than 1.8, the ratio (T/O), which is a ratio of a content (T) of the tackifier (b) to a content (O) of the oil (c), is 1.0 or more and 4.0 or less;

when the ratio (P/O), which is a ratio of a content (P) of the block copolymer (a) to a content (O) of the oil (c), is 1.8 or more and 6.0 or less, the ratio (T/O), which is a ratio of a content (T) of the tackifier (b) to a content (O) of the oil (c), is 2.1 or more and 8.2 or less;

a content of the tackifier (b) is 60 parts by mass or more and 240 parts by mass or less based on 100 parts by mass of the block copolymer (a); and a content of the oil (c) is 10 parts by mass or more and 140 parts by mass or less based on 100 parts by mass of the block copolymer (a).

[2]

The adhesive composition according to [1], wherein the partially hydrogenated block copolymer (a-1) comprises a block mainly comprising a vinyl aromatic monomer unit, and a content of the block mainly comprising a vinyl aromatic monomer unit is 10 mass % or more and 19 mass % or less based on 100 mass % of the partially hydrogenated block copolymer (a-1).

[3]

The adhesive composition according to [1] or [2], wherein the ratio (P/O), which is a ratio of a content (P) of the block copolymer (a) to a content (O) of the oil (c), is 1.8 or more and 6.0 or less.

[4]

The adhesive composition according to any one of [1] to [3], wherein the content of the oil (c) is 10 parts by mass or more and 55 parts by mass or less.

[5]

The adhesive composition according to [1] or [2], wherein the ratio (P/O), which is a ratio of a content (P) of the block copolymer (a) to a content (O) of the oil (c), is 0.7 or more and less than 1.8.

[6]

The adhesive composition according to any one of [1], and [5], wherein the content of the oil (c) is 62 parts by mass or more and 140 parts by mass or less.

[7]

The adhesive composition according to any one of [1] to [6], wherein the hydrogenation ratio of double bonds contained in the conjugated diene monomer unit in the partially hydrogenated block copolymer (a-1) is 31 mol % or more and 70 mol % or less based on the total (amount) of double bonds before hydrogenation.

[8]

The adhesive composition according to any one of [1] to [7], wherein the partially hydrogenated block copolymer (a-1) comprises, a partially hydrogenated block copolymer (a-1-1), which consists of two or more blocks mainly comprising a vinyl aromatic monomer unit and one or more blocks mainly comprising the conjugated diene monomer unit, and a partially hydrogenated block copolymer (a-1-2), which consists of a single block mainly comprising a vinyl aromatic monomer unit and a single block mainly comprising the conjugated diene monomer unit;

a weight-average molecular weight of the partially hydrogenated block copolymer (a-1-2) is smaller than a weight-average molecular weight of the partially hydrogenated block copolymer (a-1-1).

[9]

The adhesive composition according to [8], wherein a ratio of a content of the partially hydrogenated block copolymer (a-1-2) to a content of a block mainly comprising a vinyl aromatic monomer unit, ((a content of the partially hydrogenated block copolymer (a-1-2))/(a content of block mainly comprising a vinyl aromatic monomer unit)), in the partially hydrogenated block copolymer (a-1) is 1.8 to 7.0.

The adhesive composition according to [8] or [9], wherein the content of the partially hydrogenated block copolymer (a-1-2) in the partially hydrogenated block copolymer (a-1) is 10 to 80 mass %.

[11]

The adhesive composition according to any one of [8] to [10], wherein a ratio of a content of the partially hydrogenated block copolymer (a-1-2) to the content of the vinyl aromatic monomer unit in the partially hydrogenated block copolymer (a-1), (a content of the partially hydrogenated block copolymer (a-1-2)/a content of the vinyl aromatic monomer unit), is 1.8 to 6.0.

[12]

The adhesive composition according to any one of [1] to [11], wherein the tackifier (b) comprises an aliphatic-based tackifier.

[13]

The adhesive composition according to any one of [1] to [12], wherein the tackifier (b) comprises a tackifier having a softening point of 87° C. or more.

[14]

The adhesive composition according to any one of [1] to [13], having a melt viscosity at 180° C. of 1000 mPa·s or more and 100000 mPa·s or less.

[15]

The adhesive composition according to any one of [1] to [14], having a storage rigidity modulus G' (G'(0° C.)) at 0° C. (measurement condition: 1 Hz) being $2 \times 10^6$ Pa or less.

[16]

The adhesive composition according to any one of [1] to [15], wherein a ratio of the storage rigidity modulus G' (G'(0° C.)) at 0° C. (measurement condition: 1 Hz) to a storage rigidity modulus G' at 30° C. (G'(30° C.)) (measurement condition: 1 Hz), ((G'(0° C.))/(G'(30° C.))), is less than 100.

[17]

The adhesive composition according to any one of [1] to [16], wherein the block copolymer (a) has at least one functional group selected from the group consisting of a hydroxyl group, an acid anhydride group, an epoxy group, an amino group, an amide group, a silanol group and an alkoxysilane group.

[18]

A pressure-sensitive adhesive tape having the adhesive composition according to any one of [1] to [17].

Advantageous Effects of Invention

According to the present invention, it is possible to provide an adhesive composition excellent in ball tack, tack strength, retentivity, coating property, color fastness, runoff resistance from the edge of a laminate, and provide a pressure-sensitive adhesive tape and label having the adhesive composition.

DESCRIPTION OF EMBODIMENTS

Now, an embodiment (hereinafter referred to as "the present embodiment") for carrying out the invention will be more specifically described, below. The present invention is not limited to the following embodiment and can be modified in various ways and put into practice.

<Adhesive Composition>

The adhesive composition of the present embodiment comprises a block copolymer (a) having a block mainly comprising a vinyl aromatic monomer unit, a tackifier (b) and an oil (c), in which the block copolymer (a) comprises a partially hydrogenated block copolymer (a-1);

the partially hydrogenated block copolymer (a-1) has a vinyl aromatic monomer unit and a conjugated diene monomer unit;

a content of the vinyl aromatic monomer unit is 10 mass % or more and 19 mass % or less based on 100 mass % of the partially hydrogenated block copolymer (a-1);

a hydrogenation ratio of double bonds contained in the conjugated diene monomer unit in the partially hydrogenated block copolymer (a-1) is 15 mol % or more and less than 80 mol % based on a total (amount) of double bonds before hydrogenation;

when a ratio (P/O), which is a ratio of a content (P) of the block copolymer (a) to a content (O) of the oil (c), is 0.7 or more and less than 1.8, a ratio (I/O), which is a ratio of a content (T) of the tackifier (b) to a content (O) of the oil (c), is 1.0 or more and 4.0 or less;

when the ratio (P/O), which is a ratio of a content (P) of the block copolymer (a) to a content (O) of the oil (c), is 1.8 or more and 6.0 or less, the ratio (I/O), which is a ratio of a content (T) of the tackifier (b) to a content (O) of the oil (c), is 2.1 or more and 8.2 or less;

a content of the tackifier (b) is 60 parts by mass or more and 240 parts by mass or less based on 100 parts by mass of the block copolymer (a); and a content of the oil (c) is 10 parts by mass or more and 140 parts by mass or less based on 100 parts by mass of the block copolymer (a).

<Block Copolymer (a)>

The block copolymer (a) to be used in the present embodiment contains a partially hydrogenated block copolymer (a-1). The partially hydrogenated block copolymer (a-1) has a block having a vinyl aromatic monomer unit and a conjugated diene monomer unit and contains a block mainly comprising a vinyl aromatic monomer unit. Herein, the constituent unit(s) constituting a polymer is referred to as a "monomer unit(s)". When the constituent unit is described as a polymer material, the constituent unit, from which "unit" is omitted, is simply referred to as a "monomer".

In the specification, "mainly comprising" means that the content of a predetermined monomer unit in the block is preferably 60 mass % or more, more preferably 80 mass % or more, further preferably 90 mass % or more and further more preferably 95 mass % or more.

(Partially Hydrogenated Block Copolymer (a-1))

The partially hydrogenated block copolymer (a-1) to be used in the present embodiment contains a block mainly comprising a vinyl aromatic monomer unit. As the structure of the partially hydrogenated block copolymer (a-1) before hydrogenation, which is not particularly limited, for example, the structures represented by the following formulas (i) to (vi) are mentioned.

$(A-B)_n$      (i)

$B-(A-B)_n$      (ii)

$A-(B-A)_n$      (iii)

$A-(B-A)_n-X$      (iv)

$[(A-B)_k]_m-X$      (v)

$[(A-B)_kA]_m-X$      (vi)

In the above formulas (i) to (vi), A represents a block mainly comprising a vinyl aromatic monomer unit; B represents a block mainly comprising a conjugated diene monomer unit; X represents a residue of a coupling agent or a residue of a polymerization initiator such as a multifunctional organic lithium; and m, n and k represent an integer of 1 or more and preferably an integer of 1 to 5.

When a plurality of blocks A and B are present in the block copolymer before hydrogenation, the structure of the molecular weights and compositions of respective blocks may be the same or different.

In the above formulas (i) to (vi), X represents a residue of a coupling agent or a residue of a polymerization initiator such as a multifunctional organic lithium. Examples of the coupling agent or the polymerization initiator such as a multifunctional organic lithium include, but are not particularly limited to, silicon tetrachloride, tin tetrachloride, epoxidized soybean oil, a polyhalogenated hydrocarbon compound, a carboxylic acid ester compound, a polyvinyl compound, a bisphenol-type epoxy compound, an alkoxysilane compound, a halogenated silane compound and an ester-based compound. The partially hydrogenated block copolymer (a-1) may be a mixture of a coupling compound where X is a residue of a coupling agent and a non-coupling compound where X is not present or X is a residue of a polymerization initiator.

Note that it is not necessary to clearly distinguish the boundary between blocks and the endmost portion of the blocks. For example, a copolymer block of a vinyl aromatic monomer unit and a conjugated diene monomer unit may be present.

The distribution of the vinyl aromatic monomer unit in the block mainly comprising a vinyl aromatic monomer unit and in the block mainly comprising a conjugated diene monomer unit is not particularly limited; the vinyl aromatic monomer unit may be uniformly distributed or distributed in the form of a taper, step, convex or concave. Alternatively, a crystal part may be present in the polymer block. In the polymer block mainly comprising a vinyl aromatic monomer unit, a plurality of segments containing the vinyl aromatic monomer unit in different contents may be present.

The content of the vinyl aromatic monomer unit in the partially hydrogenated block copolymer (a-1) is 10 mass % or more and 19 mass % or less, preferably 11 mass % or more and 18 mass % or less, more preferably 11 mass % or more and 17 mass % or less, further preferably 12 mass % or more and 16 mass % or less and further more preferably 13 mass % or more and 15 mass % or less, based on 100 mass % of the partially hydrogenated block copolymer (a-1). If the content of the vinyl aromatic monomer unit is 10 mass % or more, tack strength, retentivity or high runoff resistance from the edge of a tape laminate further improves. In contrast, if the content of the vinyl aromatic monomer unit is 19 mass % or less, tackiness, coating property or color fastness further improves. Note that the content of the vinyl aromatic monomer unit can be measured by the method described in Examples (described later).

The content of the block mainly comprising a vinyl aromatic monomer unit in the partially hydrogenated block copolymer (a-1) is preferably 10 mass % or more and 19 mass % or less, more preferably 11 mass % or more and 18 mass % or less, further preferably 11 mass % or more and 17 mass % or less, further more preferably 12 mass % or more and 16 mass % or less and still further preferably 13 mass % or more and 15 mass % or less, based on 100 mass % of the partially hydrogenated block copolymer (a-1). If the content of the block mainly comprising a vinyl aromatic monomer unit is 10 mass % or more, tack strength, retentivity or high runoff resistance from the edge of a tape laminate further improves. In contrast, if the content of the block mainly comprising a vinyl aromatic monomer unit is 19 mass % or less, tackiness, coating property or color fastness further improves. Note that, the content of the block mainly comprising a vinyl aromatic monomer unit can be measured by the method described in Examples (described later).

The partially hydrogenated block copolymer (a-1) preferably contains a partially hydrogenated block copolymer (a-1-1), which consists of two or more blocks mainly comprising a vinyl aromatic monomer unit and one or more blocks mainly comprising a conjugated diene monomer unit, and a partially hydrogenated block copolymer (a-1-2), which consists of a single block mainly comprising a vinyl aromatic monomer unit and a single block mainly comprising a conjugated diene monomer unit. Herein, the weight-average molecular weight of the partially hydrogenated block copolymer (a-1-2) is preferably lower than the weight-average molecular weight of the partially hydrogenated block copolymer (a-1-1). If such a partially hydrogenated block copolymer (a-1) is used, tackiness, coating property, thermal degradation resistance and high runoff resistance from the edge of a tape laminate tend to further improve.

The partially hydrogenated block copolymer (a-1-1) preferably has a structure having two A, such as a structure represented by A-B-A, $(A-B)_2$ or $(A-B)_2-X$. The partially hydrogenated block copolymer (a-1-2) preferably has a structure having a single A, such as a structure represented by A-B or (A-B)—X. If a partially hydrogenated block copolymer (a-1-1) and a partially hydrogenated block copolymer (a-1-2) as mentioned above are present, tackiness, coating property and heat deterioration resistance tend to further improve.

If the partially hydrogenated block copolymer (a-1) is a mixture of a partially hydrogenated block copolymer (a-1-1) and a partially hydrogenated block copolymer (a-1-2) as mentioned above, the content of the partially hydrogenated block copolymer (a-1-1) in the partially hydrogenated block copolymer (a-1) is preferably 20 mass % or more and 90 mass % or less, more preferably 30 mass % or more and 80 mass % or less and further preferably 40 mass % or more and 70 mass % or less, based on 100 mass % of the partially hydrogenated block copolymer (a-1). Whereas, the content of the partially hydrogenated block copolymer (a-1-2) is preferably 10 mass % or more and 80 mass % or less, more preferably 20 mass % or more and 70 mass % or less and further preferably 30 mass % or more and 60 mass % or less, based on 100 mass % of the partially hydrogenated block copolymer (a-1). If the contents of the partially hydrogenated block copolymer (a-1-1) and the partially hydrogenated block copolymer (a-1-2) fall within the ranges mentioned above, tackiness, tack strength, retentivity and coating property tend to further improve.

Note that, the contents of the partially hydrogenated block copolymer (a-1-1) and the partially hydrogenated block copolymer (a-1-2) in the partially hydrogenated block copolymer (a-1) can be measured by the method described in Examples (described later).

The ratio of a content of a partially hydrogenated block copolymer (a-1-2) to a content of a block mainly comprising a vinyl aromatic monomer unit, i.e., ((content of partially hydrogenated block copolymer (a-1-2))/(content of block mainly comprising vinyl aromatic monomer unit)), in the partially hydrogenated block copolymer (a-1), is preferably 1.8 to 7.0, more preferably 2.0 to 6.5, further preferably 2.5 to 6.0 and further more preferably 3.0 to 5.5. If the ratio ((content of partially hydrogenated block copolymer (a-1-2))/(content of block mainly comprising vinyl aromatic monomer unit)) is 1.8 or more, ball tack, tack strength, retentivity and coating property tend to further improve. In contrast, if the ratio ((content of partially hydrogenated block copolymer (a-1-2))/(content of block mainly comprising vinyl aromatic monomer unit)) is 7.0 or less, retentivity, runoff resistance from the edge of a laminate tend to further improve.

The ratio of the content of a partially hydrogenated block copolymer (a-1-2) to the content of a vinyl aromatic monomer unit, i.e., ((content of partially hydrogenated block copolymer (a-1-2))/(content of vinyl aromatic monomer unit)), in the partially hydrogenated block copolymer (a-1), is preferably 1.8 to 6.0, more preferably 2.0 to 6.0, further preferably 2.5 to 5.0 and further more preferably 3.5 to 4.0. If the ratio ((content of partially hydrogenated block copolymer (a-1-2))/(content of vinyl aromatic monomer unit)) is 1.8 or more, ball tack, tack strength and retentivity tend to further improve. In contrast, if the ratio ((content of partially hydrogenated block copolymer (a-1-2))/(content of vinyl aromatic monomer unit)) is 6.0 or less, coating property, color fastness and tape runoff resistance from the edge of a laminate tend to further improve.

Note that the content of a partially hydrogenated block copolymer (a-1-2), the content of a block mainly comprising a vinyl aromatic monomer unit and the content of a vinyl aromatic monomer unit in a partially hydrogenated block copolymer (a-1) can be measured by the method described in Examples (described later).

The hydrogenation ratio of double bonds contained in the conjugated diene monomer unit in the partially hydrogenated block copolymer (a-1) to be used in the present embodiment is 15 mol % or more and less than 80 mol %, more preferably 20 mol % or more and 74 mol % or less, more preferably 31 mol % or more and 70 mol % or less, further preferably 33 mol % or more and 63 mol % or less and further more preferably 35 mol % or more and 59 mol % or less, based on the total (amount) of double bonds before hydrogenation. If the hydrogenation ratio of double bonds falls within the range mentioned above, tackiness, tack strength, retentivity, coating property, color fastness and high runoff resistance from the edge of a tape laminate further improve. The hydrogenation ratio of double bonds can be controlled by varying the hydrogenation amount and the reaction time of hydrogenation in the hydrogenated process (described later). The hydrogenation ratio can be obtained by the method described in Examples (described later).

The vinyl content in a conjugated diene monomer unit before hydrogenation in the partially hydrogenated block copolymer (a-1) to be used in the present embodiment is preferably 15 mol % or more and 75 mol % or less, more preferably 25 mol % or more and 55 mol % or less and further preferably 35 mol % or more and 45 mol % or less. If the vinyl content in a conjugated diene monomer unit before hydrogenation is 15 mol % or more, tackiness, tack strength and retentivity tend to further improve. In contrast, if the vinyl content in a conjugated diene monomer unit before hydrogenation is 75 mol % or less, tackiness and heat deterioration resistance tend to further improve. Herein, "the vinyl content" is specified as the ratio of conjugated diene monomer units integrated via a 1,2-bond and a 3,4-bond to the total (molar amount) of the conjugated diene monomer units integrated via a binding mode of a 1,2-bond, 3,4-bond and 1,4-bond of a conjugated diene before hydrogenation. Note that, the vinyl content can be measured by NMR, more specifically, the method described in Examples (described later). The distribution of the vinyl content in a block mainly comprising a conjugated diene monomer unit is not limited.

The melt flow rate (MFR, 200° C., 5 kgf) of a partially hydrogenated block copolymer (a-1) is preferably 0.1 g/10 minutes or more and 30 g/10 minutes or less, more preferably 0.2 g/10 minutes or more and 15 g/10 minutes or less, further preferably 0.3 g/10 minutes or more and 8 g/10 minutes or less, and further more preferably 0.4 g/10 minutes or more and 5 g/10 minutes or less. If the MFR of a partially hydrogenated block copolymer (a-1) is 0.1 g/10 minutes or more, tackiness, tack strength, retentivity and high runoff resistance from the edge of a tape laminate tend to further improve. In contrast, if the MFR of a partially hydrogenated block copolymer (a-1) is 30 g/10 minutes or less, coating property and color fastness tend to further improve.

The block copolymer (a) may contain another block copolymer containing a block mainly comprising a vinyl aromatic monomer unit other than a partially hydrogenated block copolymer (a-1). Examples of the other block copolymer include, but are not particularly limited to, a styrene-butadiene block copolymer, a styrene-isoprene block copolymer, a hydrogenated styrene-butadiene block copolymer and a hydrogenated styrene-isoprene block copolymer.

In the case where a block copolymer (a) contains another block copolymer containing a block mainly comprising a vinyl aromatic monomer unit other than a partially hydrogenated block copolymer (a-1), the content of the partially hydrogenated block copolymer (a-1) in the block copolymer (a) is preferably 50 mass % or more, more preferably 70 mass % or more, further preferably 80 mass % or more and further more preferably 90 mass % or more, based on the total amount of the block copolymer (a). The upper limit of the content of the partially hydrogenated block copolymer (a-1), which is not particularly limited, is 100 mass %. If the content of the partially hydrogenated block copolymer (a-1)

falls within the range mentioned above, tackiness, tack strength, retentivity and coating property tend to further improve.

The content of the other block copolymer containing a block mainly comprising a vinyl aromatic monomer unit in the block copolymer (a) is preferably 50 mass % or less, more preferably 30 mass % or less, further preferably 20 mass % or less and further more preferably 10 mass % or less, based on the total amount of the block copolymer (a).

The block copolymer (a), in particular, the partially hydrogenated block copolymer (a-1), preferably has at least one functional group selected from the group consisting of a hydroxyl group, an acid anhydride group, an epoxy group, an amino group, an amide group, a silanol group and an alkoxysilane group. Of them, an amino group and an amide group are more preferable and an amino group is further preferable. If the block copolymer (a) has such a functional group, the tackiness, tack strength and retentivity of the adhesive composition tend to further improve. In addition, the partially hydrogenated block copolymer (a-1) preferably contains 2 mol or more of an N group per molecule (1 mole).

<Method for Producing Partially Hydrogenated Block Copolymer (a-1)>

The partially hydrogenated block copolymer (a-1) to be used in the present embodiment can be produced by sequentially carrying out a polymerization step of polymerizing at least a conjugated diene monomer and a vinyl aromatic monomer in a hydrocarbon solvent using a lithium compound as a polymerization initiator to obtain a polymer; a hydrogenation step of hydrogenating a double bond of a conjugated diene monomer unit in the obtained polymer; and a desolvation step of removing the solvent from a solution containing the polymer.

(Polymerization Step)

In the polymerization step, a polymer is obtained by polymerizing at least a conjugated diene monomer and a vinyl aromatic monomer in a hydrocarbon solvent using a lithium compound as a polymerization initiator.

(Hydrocarbon Solvent)

Examples of the hydrocarbon solvent to be used in the polymerization step include, but are not particularly limited to, aliphatic hydrocarbons such as butane, pentane, hexane, isopentane, heptane and octane; alicyclic hydrocarbons such as cyclopentane, methylcyclopentane, cyclohexane, methylcyclohexane and ethylcyclohexane; and aromatic hydrocarbons such as benzene, toluene, ethylbenzene and xylene. These may be used alone or as a mixture of two or more.

(Polymerization Initiator)

Examples of the lithium compound to be used as a polymerization initiator in the polymerization step include, but are not particularly limited to, compounds having at least one lithium atom bound in a molecule, such as an organic monolithium compound, an organic dilithium compound and an organic polylithium compound. Examples of such an organic lithium compound include, but are not particularly limited to, ethyl lithium, n-propyl lithium, isopropyl lithium, n-butyl lithium, sec-butyl lithium, tert-butyl lithium, hexamethylene dilithium, butadienyl dilithium and isoprenyl dilithium. These may be used alone or in combination of two or more.

(Monomer to be Used in Polymerization)

Examples of the conjugated diene monomer include, but are not particularly limited to, diolefins having a pair of conjugated double bonds, such as 1,3-butadiene, 2-methyl-1,3-butadiene (isoprene), 2,3-dimethyl-1,3-butadiene, 1,3-pentadiene, 2-methyl-1,3-pentadiene and 1,3-hexadiene. Of these, 1,3-butadiene and isoprene are preferably mentioned. In view of mechanical strength, 1,3-butadiene is more preferable. These may be used alone or in combination of two or more.

Examples of the vinyl aromatic monomer include, but are not particularly limited to, vinyl aromatic compounds such as styrene, α-methylstyrene, p-methylstyrene, divinylbenzene, 1,1-diphenylethylene, N,N-dimethyl-p-aminoethylstyrene and N,N-diethyl-p-aminoethylstyrene. Of these, from an economic point of view, styrene is preferable. These may be used alone or in combination of two or more.

Other than a conjugated diene monomer and a vinyl aromatic monomer as mentioned above, other monomers copolymerizable with the conjugated diene monomer and the vinyl aromatic monomer can also be used.

In the polymerization step, in order to control a polymerization rate, to control a microstructure (the ratio of cis, trans and vinyl) of the polymerized conjugated diene monomer unit and to control the reaction ratio of the conjugated diene monomer and the vinyl aromatic monomer, a predetermined polar compound and a randomizing agent can be used.

Examples of the polar compound and randomizing agent include, but are not particularly limited to, ethers such as tetrahydrofuran, diethylene glycol dimethyl ether and diethylene glycol dibutyl ether; amines such as triethylamine and tetramethylethylene diamine; thioethers; phosphines; phosphoramides; alkyl benzene sulfonates; and potassium and sodium alkoxides.

In the method for producing a partially hydrogenated block copolymer (a-1), the polymerization process carried out in the polymerization step, is not particularly limited, and known processes can be employed. Examples of the known processes include the processes described in e.g., Japanese Patent Publication No. S36-19286, Japanese Patent Publication No. S43-17979, Japanese Patent Publication No. S46-32415, Japanese Patent Publication No. S49-36957, Japanese Patent Publication No. S48-2423, Japanese Patent Publication No. S48-4106, Japanese Patent Publication No. S56-28925, Japanese Patent Laid-Open No. S59-166518 and Japanese Patent Laid-Open No. S60-186577.

When the partially hydrogenated block copolymer (a-1) is a mixture of a partially hydrogenated block copolymer (a-1-1) and a partially hydrogenated block copolymer (a-1-2), individual polymers may be blended or may be coupled to produce the copolymer (a-1) at a time.

As the coupling agent, which is not particularly limited, any bifunctional or more coupling agent can be used. Examples of the bifunctional coupling agent include, but are not particularly limited to, bifunctional halogenated silanes such as dichlorosilane, monomethyldichlorosilane and dimethyldichlorosilane; bifunctional alkoxysilanes such as diphenyldimethoxysilane, diphenyldiethoxysilane, dimethyldimethoxysilane and dimethyldiethoxysilane; bifunctional halogenated alkanes such as dichloroethane, dibromoethane, methylene chloride and dibromomethane; bifunctional halogenated tins such as tin dichloride, monomethyltin dichloride, dimethyltin dichloride, monoethyltin dichloride, diethyltin dichloride, monobutyltin dichloride and dibutyltin dichloride; and dibromobenzene, benzoic acid, CO and 2-chloropropene.

Examples of the trifunctional coupling agent include, but are not particularly limited to, trifunctional halogenated alkanes such as trichloroethane and trichloropropane; trifunctional halogenated silanes such as methyl trichlorosilane and ethyl trichlorosilane; and trifunctional alkoxysilanes such as methyltrimethoxysilane, phenyltrimethoxysilane and phenyltriethoxysilane.

Examples of the tetrafunctional coupling agent include, but are not particularly limited to, tetrafunctional halogenated alkanes such as carbon tetrachloride, carbon tetrabromide and tetrachloroethane; tetrafunctional halogenated silanes such as tetrachlorosilane and tetrabromosilane; tetrafunctional alkoxysilanes such as tetramethoxysilane and tetraethoxysilane; and tetrafunctional halogenated tin such as tin tetrachloride and tin tetrabromide.

Examples of the penta- or higher functional coupling agent include, but are not particularly limited to, 1,1,1,2,2-pentachloroethane, perchloroethane, pentachlorobenzene, perchlorobenzene, octabromodiphenyl ether and decabromodiphenyl ether. Other than these, epoxidized soybean oil, bi- to hexa-functional epoxy group-containing compound, a carboxylic acid ester and a polyvinyl compound such as divinyl benzene can be used. The coupling agents may be used alone or in combination of two or more.

Herein, the weight-average molecular weight of a partially hydrogenated block copolymer (a-1-2) is preferably lower than the weight-average molecular weight of a partially hydrogenated block copolymer (a-1-1). If such a partially hydrogenated block copolymer (a-1) is used, tackiness, coating property, thermal degradation resistance and high runoff resistance from the edge of a tape laminate tend to further improve.

<Inactivation Process>

The active end of a polymer is preferably inactivated by an inactivation process. The active end of a polymer can be inactivated by a method of reacting the active end with a compound having active hydrogen. As the compound having active hydrogen, which is not particularly limited, alcohol and water are preferable from an economic point of view.

(Hydrogenation Step)

The hydrogenation step is a step of hydrogenating a part of double bonds in a conjugated diene monomer unit of a polymer obtained in the polymerization step. Example of a catalyst used in the hydrogenation reaction include, but are not particularly limited to, heterogeneous catalysts in which a metal such as Ni, Pt, Pd, Ru is carried by a carrier such as carbon, silica, alumina and diatomaceous earth; so-called Ziegler catalysts using an organic salt or an acetylacetone salt of Ni, Co, Fe and Cr and a reducing agent such as organic Al; so-called organic complex catalysts such as organometallic compounds of e.g., Ru and Rh; and homogeneous catalysts using a titanocene compound in combination with a reducing agent such as organic Li, organic Al and organic Mg. Of these, in view of economic efficiency, coloring or adhesive strength of a polymer, a homogeneous catalyst using a titanocene compound in combination with a reducing agent such as organic Li, organic Al and organic Mg is preferable.

As the hydrogenation method, which is not particularly limited, methods described in Japanese Patent Publication No. S42-8704 and Japanese Patent Publication No. S43-6636 are mentioned and preferably the methods described in Japanese Patent Publication No. S63-4841 and Japanese Patent Publication No. S63-5401 are mentioned. More specifically, a block copolymer is hydrogenated in an inert solvent in the presence of a hydrogenation catalyst, with the result that a hydrogenated block copolymer solution can be obtained.

Although it is not particularly limited, the hydrogenation reaction is preferably carried out after the aforementioned step of inactivating the active end of a polymer, in order to obtain a high hydrogenation activity.

In the hydrogenation step, conjugated bonds of a vinyl aromatic monomer unit may be hydrogenated. The hydrogenation ratio of conjugated bonds in all vinyl aromatic monomer units is preferably 30 mol % or less, more preferably 10 mol % or less and further preferably 3 mol % or less. The lower limit of the hydrogenation ratio of conjugated bonds in all vinyl aromatic monomers, which is not particularly limited, is 0 mol %. If the hydrogenation ratio of conjugated bonds in all vinyl aromatic monomers falls within the range mentioned above, retentivity and adhesiveness tend to further improve.

(Step of Adding a Functional Group)

It is preferable that a functional group is added to a polymer by using a compound having a functional group as an initiator, a monomer, a coupling agent or a terminator.

As the initiator containing a functional group, an initiator containing a nitrogen-containing group is preferable. Examples thereof include dioctylaminolithium, di-2-ethylhexylaminolithium, ethylbenzylaminolithium, (3-(dibutylamino)-propyl)lithium and piperidinolithium.

As the monomer containing a functional group, monomer compounds, which are used in polymerization mentioned above, containing a hydroxyl group, an acid anhydride group, an epoxy group, an amino group, an amide group, a silanol group and an alkoxysilane group are mentioned. Of them, a monomer containing a nitrogen-containing group is preferable. Examples thereof include N,N-dimethyl-vinylbenzylamine, N,N-diethyl-vinylbenzylamine, N,N-dipropyl-vinyl benzylamine, N,N-dibutyl-vinylbenzyl amine, N,N-diphenyl-vinylbenzylamine, 2-dimethylaminoethylstyrene, 2-diethylaminoethylstyrene, 2-bis(trimethylsilyl)aminoethystyrene, 1-(4-N,N-dimethylaminophenyl)-1-phenylethylene, N,N-dimethyl-2-(4-vinylbenzyloxy)ethylamine, 4-(2-pyrrolidinoethyl)styrene, 4-(2-piperidinoethyl)styrene, 4-(2-hexamethyleneiminoethyl)styrene, 4-(2-morpholinoethyl)styrene, 4-(2-thiazinoethyl)styrene, 4-(2-N-methylpiperazinoethyl) styrene, 1-((4-vinylphenoxy)methyl)pyrrolidine and 1-(4-vinylbenzyloxymethyl)pyrrolidine.

As the coupling agent and terminator containing a functional group, among the aforementioned coupling agents, compounds containing a hydroxyl group, an acid anhydride group, an epoxy group, an amino group, an amide group, a silanol group and an alkoxysilane group are mentioned.

Of them, coupling agents containing a nitrogen-containing group and an oxygen-containing group are preferable. Examples thereof include tetraglycidylmetaxylenediamine, tetraglycidyl-1,3-bisaminomethylcyclohexane, tetraglycidyl-p-phenylenediamine, tetraglycidyldiaminodiphenylmethane, diglycidylaniline, γ-caprolactone, γ-glycidoxyethyltrimethoxysilane, γ-glycidoxypropyltrimethoxysilane, γ-glycidoxypropyltriphenoxysilane, γ-glycidoxypropylmethyldimethoxysilane, γ-glycidoxypropyldiethylethoxysilane, 1,3-dimethyl-2-imidazolidinone, 1,3-diethyl-2-imidazolidinone, N,N'-dimethylpropyleneurea and N-methyl-pyrrolidone.

(Desolvation Step)

The desolvation step is a step of removing a solvent from a solution containing a polymer. As the method for removing a solvent, which is not particularly limited, a steam stripping method and a direct desolvation method are mentioned.

The remaining amount of the solvent in the partially hydrogenated block copolymer (a-1) obtained in the desolvation step is preferably 2 mass % or less, more preferably 0.5 mass % or less, further preferably 0.2 mass % or less, further more preferably 0.05 mass % or less and still further preferably 0.01 mass % or less. In contrast, the lower limit of the remaining amount of the solvent in the polymer is not particularly limited; however, the lower the remaining amount of the solvent, the more preferable. The remaining amount of the solvent is further preferably 0 mass %; however, the remaining amount of the solvent usually falls within the range of 0.01 mass % or more and 0.1 mass % from an economic point of view at the time of desolation.

In view of heat deterioration resistance and suppression of gelation of a partially hydrogenated block copolymer (a-1), an antioxidant is preferably added. Examples of the antioxidant include, but are not particularly limited to, a phenolic antioxidant such as a radical scavenger; a phosphorus-based antioxidant such as a peroxide decomposer and a sulfur-based antioxidant. An antioxidant having both functions may be used. These may be used alone or in combination of two or more. Of these, a phenolic antioxidant is preferably added in view of heat deterioration resistance and suppression of gelation of a partially hydrogenated block copolymer (a-1).

Other than these, in view of color protection and mechanical strength improvement of a partially hydrogenated block copolymer (a-1), a decalcification step of removing metals in the polymer and a neutralization step of controlling the pH of the polymer, for example, by adding an acid or carbon dioxide gas may be carried out before the desolvation step.

<Tackifier (b)>

Examples of the tackifier (b) to be used in the present embodiment include, but are not particularly limited to, a rosin derivative (including tung oil resin), tall oil, derivatives of tall oil, rosin ester resins, natural and synthetic terpene resins, aliphatic hydrocarbon resins, aromatic hydrocarbon resins, mixed aliphatic-aromatic hydrocarbon resins, coumarin-indene resins, phenol resins, p-tert-butylphenol-acetylene resins, phenol-formaldehyde resins, xylene-formaldehyde resins, oligomers of monoolefins, oligomers of diolefins, aromatic hydrocarbon resins, cyclicaliphatic hydrocarbon resins, hydrogenated hydrocarbon resins, hydrocarbon resins, hydrogenated tung oil resins, hydrogenated oil resins and esters of a hydrogenated oil resin and a mono-functional or multi-functional alcohol. These may be used alone or in combination of two or more.

In view of high tackiness, high tack strength, high retentivity, high coating property and economic efficiency, it is more preferable that an aliphatic-based tackifier is contained. The content of a non-hydrogenated aromatic component that the aliphatic-based tackifier can contain is preferably 20 mass % or less, more preferably 12 mass % or less and further preferably 8 mass % or less.

The "aliphatic-based tackifier" refers to a tackifier having a content of an aliphatic hydrocarbon group of preferably 50 mass % or more, more preferably 70 mass % or more, further preferably 80 mass % or more, further more preferably 88 mass % or more and still further preferably 95 mass % or more. If the content of the aliphatic hydrocarbon group falls within the above range, tackiness, tack strength, retentivity, coating property and economic efficiency tend to further improve.

Examples of commercially available products of the aliphatic-based tackifier include, but are not particularly limited to, ESCOREZ 1202, 1304, 1401 (manufactured by Tonex Co., Ltd.), Wing tack 95 (manufactured by Good Year), Quinton A100, B170, M100, R100 (manufactured by ZEON CORPORATION), Pico tack 95, Picopale 100 (manufactured by Rika Hercules Co.) and Hilets T100X, G100X (manufactured by Mitsui Petrochemical Co., Ltd).

An aliphatic-based tackifier can be produced from a monomer having an aliphatic group and a polymerizable unsaturated group. Examples of the monomer to be used include, but are not particularly limited to, natural and synthetic terpenes having a C5 or C6 cyclopentyl or cyclohexyl group.

Also, an aromatic tackifier may be used. The "aromatic tackifier" refers to a tackifier having a content of an aromatic hydrocarbon group of preferably 50 mass % or more, more preferably 70 mass % or more, further preferably 80 mass % or more, further more preferably 88 mass % or more and still further preferably 95 mass % or more. The aromatic tackifier may be used in combination with an aliphatic-based tackifier in order to obtain high ball tack, high tack strength, high retentivity, high coating property and high runoff resistance from the edge of a tape laminate.

The aromatic tackifier can be produced from monomers having an aromatic group and a polymerizable unsaturated group, respectively. Examples of the monomers that can be used include, but are not particularly limited to, styrene, α-methylstyrene, vinyltoluene, methoxystyrene, tert-butylstyrene, chlorostyrene and indene monomer (including methylindene).

Examples of other monomers that can be used include, but are not particularly limited to, 1,3-butadiene, cis-1,3-pentadiene, trans-1,3-pentadiene, 2-methyl-1,3-butadiene, 2-methyl-2-butene, cyclopentadiene, dicyclopentadiene, terpene and a terpene-phenolic resin.

The tackifier (b) to be used in the present embodiment, preferably contains a tackifier having a softening point of 87° C. or more, in view of adhesive strength, retentivity and high runoff resistance from the edge of a tape laminate. The softening point of a tackifier is more preferably 91° C. or more, further preferably 95° C. or more and further more preferably 100° C. or more. The upper limit of the softening point of a tackifier, which is not particularly limited, is preferably 145° C. or less. The softening point is a value measured in accordance with JISK2207 (ring and ball method).

In the case where e.g., high adhesion, time-dependent change of adhesion strength or creep performance is particularly required, 20 to 75 mass % of a tackifier (b) having affinity for a non-glass phase block (usually, an intermediate block) of a block copolymer (a) that can be used in the adhesive composition of the present embodiment and 3 to 30 mass % of a tackifier (b) having affinity for a glass phase block (usually, outer block) of the block polymer are more preferably contained in the adhesive composition.

As the tackifier (b) having affinity for a glass phase block of a block copolymer, which is not particularly limited, a tackifier having an end block is preferable. Examples of such a tackifier (b) include, but are not particularly limited to, resins mainly having an aromatic group, such as a homopolymer or a copolymer containing e.g., vinyltoluene, styrene, α-methylstyrene, coumarone or indene. Of these, Kristalex and Plastolyn (trade names, manufactured by Eastman Chemical Company) having α-methylstyrene are preferable. The content of the tackifier (b) having affinity for a glass phase block of a block copolymer is preferably 3 to 30 mass %, more preferably 5 to 20 mass % and further preferably 6 to 12 mass %, based on the total amount of an adhesive composition.

In the case where e.g., high initial adhesion, high wettability, low melt viscosity or high coating property of an adhesive composition is required, a petroleum resin having an aroma content of 3 to 12 mass % is preferably used and a petroleum resin having an aroma content of 3 to 12 mass % and hydrogenated is more preferably used as the tackifier (b). In this case, the aroma content of the tackifier (b) is preferably 3 to 12 mass % and more preferably 4 to 10 mass %.

The content of the tackifier (b) in the adhesive composition of the present embodiment is 60 parts by mass or more and 240 parts by mass or less, preferably 110 parts by mass or more and 230 parts by mass or less, more preferably 135 parts by mass or more and 200 parts by mass or less, further preferably 140 parts by mass or more and 185 parts by mass or less and further more preferably 155 parts by mass or more and 180 parts by mass or less, based on 100 parts by mass of the block copolymer (a). If the content of the tackifier (b) falls within the above range, tackiness, tack strength, retentivity, coating property, color fastness and high runoff resistance from the edge of a tape laminate tend to further improve.

Note that, in the case where a polymer (described later) other than the block copolymer (a) in the present embodiment is added, the content of tackifier (b) is specified to be 60 parts by mass or more and 240 parts by mass or less based on the total content (100 parts by mass) of the polymer except the block copolymer (a) to be used in the present embodiment and the block copolymer (a).

<Oil (c)>

Examples of the oil (c) to be used in the present embodiment include, but are not particularly limited to, a paraffinic oil containing a paraffinic hydrocarbon as a main component, a naphthenic oil containing a naphthenic hydrocarbon as a main component and an aromatic oil containing an aromatic hydrocarbon as a main component. Of these, a colorless and substantially odorless oil is preferable.

The oil (c) may be used alone or in combination of two or more.

Examples of the paraffinic oil include, but are not particularly limited to, Diana Process Oil PW-32, PW-90, PW-150, PS-430 (manufactured by Idemitsu Kosan Co., Ltd.), Syntack PA-95, PA-100, PA-140 (manufactured by KOBE OIL CHEMICAL INDUSTRIAL Co., Ltd.), JOMO PROCESS P200, P300, P500, 750 (manufactured by Japan Energy Corporation), SUNPAR-110, 115, 120, 130, 150, 2100, 2280 (manufactured by JAPAN SUN OIL COMPANY. LTD.) and Fukkol process P-100, P-200, P-300, P-400, P-500 (manufactured by FUJI KOSAN CO., LTD.).

Examples of the naphthenic oil include, but are not particularly limited to, Diana Process Oil NP-24, NR-26, NR-68, NS-905, NS-100, NM-280 (manufactured by Idemitsu Kosan Co., Ltd.), Syntack N-40, N-60, N-70, N-75, N-80 (manufactured by KOBE OIL CHEMICAL INDUSTRIAL Co., Ltd.), Shell Flex 371JY (manufactured by Shell Japan), JOMO Process R25, R50, R200, R1000 (manufactured by Japan Energy Corporation), SUNTHENE oil 310, 410, 415, 420, 430, 450, 380, 480, 3125, 4130, 4240 (manufactured by JAPAN SUN OIL COMPANY. LTD), Fukkol New FLEX 1060W, 1060E, 1150W, 1150E, 1400W, 1400E, 2040E, 2050N (manufactured by FUJI KOSAN CO., LTD.) and Petlex process oil PN-3, PN-3M, PN-3N-H (manufactured by Yamabun-yuka Co., Ltd.).

Examples of the aromatic oil include, but are not particularly limited to, Diana Process Oil AC-12, AC-640, AH-16, AH-24, AH-58 (manufactured by Idemitsu Kosan Co., Ltd.), Syntack HA-10, HA-15, HA-30, HA-35 (manufactured by KOBE OIL CHEMICAL INDUSTRIAL Co., Ltd.), COSMO Process 40, 40A, 40C, 200A, 100, 1000 (manufactured by COSMO OIL LUBRICANTS Co., Ltd.), JOMO PROCESS X50, X100E, X140 (manufactured by Japan Energy Corporation), JSO Aroma 790, Nitoplane 720L (manufactured by JAPAN SUN OIL COMPANY), Fukkol Aromax1, 3, 5, EXP1 (manufactured by FUJI KOSAN CO., LTD.), and Petlex process oil LPO-R, LPO-V, PF-2 (manufactured by Yamabun-yuka Co., Ltd.).

In view of balance between high retentivity, tack strength, adhesive deposit resistance and high runoff resistance from the edge of an adhesive-tape laminate, the content of the oil (c) to be used in the present embodiment is 10 parts by mass or more and 140 parts by mass or less and preferably 10 parts by mass or more 55 parts by mass or less, based on 100 parts by mass of the block copolymer (a).

In view of high ball tack, coating property, short mixing time for preparing a composition, the content of the oil (c) to be used in the present embodiment is preferably 62 parts by mass or more and 140 parts by mass or less, more preferably 70 parts by mass or more and 130 parts by mass or less and further preferably 80 parts by mass or more and 120 parts by mass or less, based on 100 parts by mass of the block copolymer (a).

Note that, in the case where a polymer (described later) other than the block copolymer (a) to be used in the present embodiment is added, the content of the oil (c) is 10 parts by mass or more and 140 parts by mass or less based on the total content (100 parts by mass) of the polymer other than the block copolymer (a) to be used in the present embodiment and the block copolymer (a).

<Adhesive Composition>

According to an aspect of the present embodiment, when the ratio (P/O), which is a ratio of a content (P) of the block copolymer (a) to a content (O) of the oil (c) in the adhesive composition, is 0.7 or more and less than 1.8, the ratio (T/O), which is a ratio of a content (T) of tackifier (b) to a content (O) of the oil (c), is 1.0 or more and 4.0 or less, preferably 1.5 or more and 3.5 or less, more preferably 1.7 or more and 3.0 or less and further preferably 1.9 or more and 2.5 or less. Also, in the aspect, the ratio (P/O) is preferably 0.8 or more and 1.7 or less, more preferably 0.9 or more and 1.6 or less, further preferably 1.0 or more and 1.5 or less and further more preferably 1.1 or more and 1.5 or less. In the aspect, if the ratio (P/O) and the ratio (T/O) satisfy the aforementioned relationships, balance between tackiness, tack strength, retentivity, coloring resistance and high runoff resistance from the edge of a tape laminate is excellent. In particular, if the ratio (I/O) is 1.5 or more and 3.5 or less, tackiness tends to further improve. In the aspect, if the ratio (P/O) is 0.8 or more and 1.7 or less, tackiness tends to further improve.

If the ratio (P/O) is 0.7 or more and less than 1.8, in view of tackiness, tack strength or retentivity, the content of the oil (c) is preferably 62 parts by mass or more and 140 parts by mass or less, more preferably 65 parts by mass or more and 125 parts by mass or less and further preferably 80 parts by mass or more and 110 parts by mass or less, based on 100 parts by mass of the block copolymer (a). In the aspect, 50 mass % or more of the oil (c) is preferably constituted of paraffinic oil.

According to another aspect of the present embodiment, when the ratio (P/O), which is a ratio of a content (P) of the block copolymer (a) to a content (O) of the oil (c) in the adhesive composition, is 1.8 or more and 6.0 or less, the ratio (T/O), which is a ratio of a content (T) of tackifier (b) to a content (O) of the oil (c), is 2.1 or more and 8.2 or less, preferably 2.5 or more and 7.5 or less, more preferably 2.8 or more and 6.0 or less, further preferably 3.2 or more and 5.5 or less and further more preferably 3.5 or more 5.2 or less. Also, in the aspect, the ratio (P/O) is preferably 1.8 or more and 4.8 or less, more preferably 1.8 or more and 3.5 or less, further preferably 1.8 or more and 3.2 or less and further more preferably 1.9 or more and 3.0 or less. In the aspect, if the ratio (P/O) and the ratio (T/O) satisfy the aforementioned relationship, balance between tackiness, tack strength, retentivity, coloring resistance and high runoff resistance from the edge of a tape laminate is excellent. In particular, if the ratio (T/O) is 2.5 or more and 7.5 or less, retentivity and tack strength tend to further improve. In the aspect, if the ratio (P/O) is 1.8 or more and 4.8 or less, retentivity and tack strength tend to further improve.

When the ratio (P/O) is 1.8 or more and 6.0 or less, in view of tackiness, tack strength or retentivity, the content of the oil (c) is preferably 10 parts by mass or more and 55 parts by mass or less, more preferably 15 parts by mass or more and 50 parts by mass or less, further preferably 21 part by mass or more and 45 parts by mass or less and further more preferably 25 parts by mass or more and 40 parts by mass or less, based on 100 parts by mass of the block copolymer (a). In the aspect, 50 mass % or more of the oil (c) is preferably constituted of naphthenic oil.

The melt viscosity of the adhesive composition of the present embodiment at 180° C. is preferably 1000 mPa·s or more and 100000 mPa·s or less.

In particular, according to an aspect of the present embodiment, the ratio (P/O), which is a ratio of a content (P) of the block copolymer (a) to a content (O) of the oil (c) in the adhesive composition, is 0.7 or more and less than 1.8, the melt viscosity of the adhesive composition at 180° C. is preferably 1000 mPa·s or more, more preferably 1200 mPa·s or more and preferably 1,500 mPa·s or more. In the aspect, if the melt viscosity of the adhesive composition at 180° C. is 1000 mPa·s or more, ball tack, retentivity and coating property at 160° C. tend to further improve. According to an aspect of the present embodiment, when the ratio (P/O), which is a ratio of a content (P) of the block copolymer (a) to a content (O) of the oil (c) in the adhesive composition, is 0.7 or more and less than 1.8, the melt viscosity of the adhesive composition at 180° C. is preferably 100,000 mPa·s or less, more preferably 10,000 mPa·s or less and further preferably 8,000 mPa·s or less. In the aspect, if the melt viscosity of the adhesive composition at 180° C. is 100,000 mPa·s or less, ball tack and coating property at 150° C. tend to further improve.

According to another aspect of the present embodiment, when the ratio (P/O), which is a ratio of a content (P) of the block copolymer (a) to a content (O) of the oil (c) in the adhesive composition, is 1.8 or more and 6.0 or less, the melt viscosity of the adhesive composition at 180° C. is preferably 1,000 mPa·s or more, more preferably 4,000 mPa·s or more, further preferably 8,000 mPa·s or more, further more preferably 10000 mPa·s or more and still further preferably 15000 mPa·s or more. In the aspect, if the melt viscosity at 180° C. is 1,000 mPa·s or more, tack strength and retentivity tend to further improve. When the ratio (P/O), which is a ratio of a content (P) of the block copolymer (a) to a content (O) of the oil (c) in the adhesive composition, is 1.8 or more and 6.0 or less, the melt viscosity of the adhesive composition at 180° C. is preferably 100,000 mPa·s or less, more preferably 90,000 mPa·s or less, further preferably 50,000 mPa·s or less and further more preferably is 40,000 mPa·s or less. In the aspect, if the melt viscosity of the adhesive composition at 180° C. is 100,000 mPa·s or less, ball tack, tack strength, coating property, color fastness and runoff resistance from the edge of a tape laminate tend to further improve.

Note that, the melt viscosity at 180° C. can be measured by the method described in Examples (described later).

The storage rigidity modulus G' (G'(0° C.)) (measurement condition: 1 Hz) at 0° C. in the adhesive composition of the present embodiment is preferably $2 \times 10^6$ Pa or less, more preferably $1.0 \times 10^6$ Pa or less, further preferably $0.7 \times 10^6$ Pa or less and most preferably $0.25 \times 10^6$ Pa or less. If the storage rigidity modulus G' is $2 \times 10^6$ Pa or less, ball tack, tack strength and low-temperature performance tend to further improve. Note that, the lower limit of storage rigidity modulus G' (measurement condition: 1 Hz) of the adhesive composition, which is not particularly limited, is preferably $1 \times 10^4$ Pa or more.

The storage rigidity modulus G' tends to increase with an increase of P/O value and decrease with an increase of T/O value within the ranges of the ratios P/O and T/O specified in the present application. The storage rigidity modulus G' tends to increase when the softening point of the tackifier (b) is high, tends to increase with an increase of the content of a block mainly comprising vinyl aromatic in the block copolymer and tends to increase with an increase of the hydrogenation ratio of the partially hydrogenated block copolymer.

The ratio of storage rigidity modulus G' at 0° C. (G'(0° C.)) (measurement condition: 1 Hz) to the storage rigidity modulus G' at 30° C. (G'(30° C.)) (measurement condition: 1 Hz) in the adhesive composition of the present embodiment, i.e., the ratio ((G'(0° C.))/(G'(30° C.))), is preferably less than 100, more preferably 20 or less, further preferably 10 or less and further more preferably 5 or less. If the ratio ((G'(0° C.))/(G'(30° C.))) is less than 100, ball tack, retentivity and coating property tend to further improve. Note that, the lower limit of the ratio ((G'(0° C.))/(G'(30° C.))), which is not particularly limited, is preferably 1 or more.

The ratio ((G'(0° C.))/(G'(30° C.))), which varies depending upon the structure of the partially hydrogenated block copolymer and the type of tackifier, tends to decrease with an increase of the value of P/O within the ranges of the ratios P/O and T/O specified by the present application; tends to increase with an increase of T/O value; tends to increase with an increase of the content of the tackifier (b); tends to decrease with an increase of the content of the oil (c) and tends to increase with an increase of the vinyl content in a conjugated diene monomer unit before hydrogenation of the partially hydrogenated block copolymer.

Note that, the storage rigidity modulus G' can be measured by the method described in Examples (described later).

<Other Additives>

The adhesive composition of the present embodiment may contain, if necessary, various additives such as an antioxidant, an ultraviolet absorber, an oxidation stabilizer, a filler, a wax, a polymer except the block copolymer (a) to be used in the present embodiment, other than a block copolymer (a), a tackifier (b) and an oil (c).

Examples of the antioxidant include, but are not particularly limited to, a phenolic antioxidant, a sulfur-based antioxidant and a phosphorus-based antioxidant.

Examples of the ultraviolet absorber include, but are not particularly limited to, a benzotriazole-based ultraviolet absorber and a benzophenone-based ultraviolet absorber.

Examples of the filler include, but are not particularly limited to, mica, calcium carbonate, kaolin, talc, diatomaceous earth, a urea resin, styrene beads, calcined clay and starch. The shape of these fillers is preferably spherical.

Examples of the wax include, but are not particularly limited to, paraffin wax, microcrystalline wax and a low molecular-weight polyethylene wax.

Examples of the polymer except the block copolymer to be used in the present embodiment include, but are not particularly limited to, olefin elastomers such as a natural rubber, a polyisoprene rubber, a polybutadiene rubber, a styrene-butadiene rubber and an ethylene-propylene copolymer; a chloroprene rubber, an acrylic rubber and an ethylene-vinyl acetate copolymer. These may be a liquid and a solid at room temperature.

If e.g., high low-temperature coating property (low viscosity), creep performance (the smaller the value, the better), high strength or high elongation is required, an ionomer may be used within the range of 5 mass % or less.

In order to obtain e.g., high-temperature storage stability, high elongation or reduce the amount of tackifier in a composition (preferably 55 mass % or less, more preferably 45 mass % or less of the adhesive composition), a copolymer using α-olefin or a propylene homopolymer is preferably contained. The melting points (conditions: DSC measurement, 5° C./minute) of these polymers are preferably 110° C. or less, more preferably 100° C. or less and further preferably 60° C. to 90° C. These polymers may be resins or elastomers.

Furthermore, if e.g., elongation is required, an olefinic elastomer is preferably used in combination. As the olefinic elastomer, which is not particularly limited, at least an olefinic elastomer having Tg of −10° C. or less is preferable. An olefinic elastomer having a block is more preferable in view of creep performance.

In the case where e.g., the surface smoothness of an adhesive composition is particularly required, a wax component may be used within the range of 20 mass % or less based on the total amount of the adhesive composition.

When a low melt viscosity is required at 130° C. or less, it is preferable that at least one type of wax selected from paraffin wax, microcrystalline wax and Fischer-Tropsch wax having a melting point of 50° C. to 110° C. is contained in an amount of 2 to 10 mass %. The content of each of these waxes is preferably 5 to 10 mass % based on the total amount of the adhesive composition. The melting point of each of these waxes is preferably 65° C. or more, more preferably 70° C. or more and further preferably 75° C. or more. The softening point of the tackifier (b) used in combination in this case is preferably 70° C. or more and more preferably 80° C. or more. At this time, the G' (measurement condition: 25° C., 10 rad/s) of the adhesive composition to be obtained herein is preferably 1 Mpa or less, and further a crystallization temperature thereof is preferably 7° C. or less.

In the case of reducing the adhesive deposit of the adhesive composition, G' (measurement condition: 25° C., 10 rad/s) of the adhesive composition is preferably 20,000 or less and more preferably 15,000 or less.

<Method for Producing an Adhesive Composition>

As a method for producing the adhesive composition of the present embodiment, which is not particularly limited, a production method of adding individual components in a predetermined blending ratio and homogeneously mixing by e.g., a known mixing machine or a kneader while heating, is mentioned.

<Uses>

The adhesive composition of the present embodiment can be preferably used in various types of adhesive tapes/labels, pressure sensitive thin plates, pressure sensitive sheets, surface protective sheets/films, adhesives (attached to rear side) for fixing various lightweight plastic moldings, adhesive (attached to rear side) for fixing carpets, adhesives (attached to rear side) for fixing tiles, adhesives and sealants, and particularly preferably used in pressure-sensitive adhesive tapes.

Examples of a method of applying the adhesive composition of the present embodiment to a substrate include, but are not particularly limited to, T-die coating method, a roll coating method, a multi-bead coating method and a spray coating method.

EXAMPLES

Now, the present invention will be more specifically described by way of Examples and Comparative Examples; however, the present invention is not limited to these.

<Block Copolymer (a)>
<Method for Producing Partially Hydrogenated Block Copolymer (a-1)>
(Hydrogenation Catalyst)

A reaction container purged with nitrogen was charged with dried and purified cyclohexane (1 L). To the container, bis(cyclopentadienyl)titanium dichloride (100 mmol) was added and then, a n-hexane solution containing trimethyl aluminum (200 mmol) was added while sufficiently stirring. The reaction mixture was allowed to react at room temperature for about 3 days to obtain a hydrogenation catalyst.

(Partially Hydrogenated Block Copolymer P1)

A tank reactor with a jacket was charged with a predetermined amount of cyclohexane and the interior temperature of the reactor was adjusted to 60° C. Thereafter, n-butyl lithium was supplied from the bottom of the reactor so as to obtain 0.10 parts by mass based on the total amount (100 parts by mass) of monomers (total amount of a butadiene monomer and a styrene monomer to be loaded to the reactor). Further, a cyclohexane solution of N,N,N',N'-tetramethylethylenediamine was added in an amount of 0.4 mol based on n-butyl lithium (1 mol). Thereafter, a cyclohexane solution (monomer concentration: 15 mass %) containing styrene (15 parts by mass), which was a monomer for use in a first step polymerization reaction, was supplied over about 10 minutes and the interior temperature of the reactor was adjusted to 60° C. After termination of the supply, the reaction was allowed to proceed for 15 minutes while controlling the interior temperature of the reactor at 70° C.

Subsequently, a cyclohexane solution (monomer concentration: 15 mass %) containing butadiene (85 parts by mass), for use in a second step polymerization reaction was supplied over 50 minutes continuously at a constant speed to the reactor while controlling the interior temperature of the reactor to be 50° C. After termination of the supply, the reaction was allowed to proceed for 10 minutes while controlling the interior temperature of the reactor at 50° C. to obtain a polystyrene-polybutadiene block copolymer.

To the resultant block copolymer, a coupling agent, i.e., a mixture, which contains a modified (diglycidyl-etherified) product of 2,2-bis(4-hydroxyphenyl)propane with epichlorohydrin and a modified (diglycidyl-etherified) product of a phenol-formaldehyde polycondensate with epichlorohydrin in weight ratio of 1/1, was added and polymers were coupled.

In this manner, a polymer solution containing a polystyrene-block-polybutadiene-block-polystyrene (a-1-1 structure) and a polystyrene-block-polybutadiene (a-1-2 structure) in a mass ratio=70 mass %/30 mass %, was obtained. The content of a vinyl aromatic monomer unit (polystyrene unit) and the content of a block (polystyrene block) mainly comprising a vinyl aromatic monomer unit in the obtained block copolymer, were both 15 mass %. The amount of a double-bond (content of vinyl in butadiene) in a conjugated diene monomer unit, was 40 mol %. The weight-average molecular weight (hereinafter referred to as "Mw") of the copolymer having a-1-2 structure was 110000 and the molecular weight (Mw) of the copolymer coupled and having a-1-1 structure was 220000.

Thereafter, the obtained coupling polymer was hydrogenated by use of the aforementioned hydrogenation catalyst at 80° C. to obtain a partially hydrogenated block copolymer. After completion of the reaction, a stabilizer (octadecyl-3-(3,5-di-t-butyl-4-hydroxyphenyl)propionate) was added in an amount of 0.25 parts by mass to the partially hydrogenated block copolymer (100 parts by mass) to obtain a partially hydrogenated block copolymer P1. The hydrogenation ratio of partially hydrogenated block copolymer P1 was 58 mol % and MFR (200° C., 5 kgf) thereof was 2.5 g/10 minutes.

The ratio (content of partially hydrogenated block copolymer (a-1-2)/content of the vinyl aromatic monomer unit) in the partially hydrogenated block copolymer (a-1) was 2.0; whereas the ratio (content of partially hydrogenated block copolymer (a-1-2)/content of block mainly comprising vinyl aromatic monomer unit) in the partially hydrogenated block copolymer (a-1) was 2.0.

(Partially Hydrogenated Block Copolymer P2)

A polymer solution containing the polystyrene-block-polybutadiene-block-polystyrene (a-1-1 structure) and the polystyrene-block-polybutadiene (a-1-2 structure) in a mass ratio=70 mass %/30 mass % was obtained in the same manner as in the method for producing partially hydrogenated block copolymer P1 except that the ratio of styrene and butadiene was changed. The content of a vinyl aromatic monomer unit (polystyrene unit) and the content of a block (polystyrene block) mainly comprising a vinyl aromatic monomer unit in the obtained block copolymer were both 20 mass %. The double-bond amount (content of vinyl in butadiene) in a conjugated diene monomer unit was 40 mol %. The Mw of the copolymer having a-1-2 structure was 110000 and the Mw of the copolymer coupled and having a-1-1 structure was 220000.

Thereafter, hydrogenation was performed in the same manner as in the production method of partially hydrogenated block copolymer P1 and a stabilizer was added to produce partially hydrogenated block copolymer P2. The hydrogenation ratio of partially hydrogenated block copolymer P2 was 58 mol % and MFR (200° C., 5 kgf) was 1.5 g/10 minutes.

The ratio (content of partially hydrogenated block copolymer (a-1-2)/content of the vinyl aromatic monomer unit) in the partially hydrogenated block copolymer (a-1) was 1.5; whereas the ratio (content of partially hydrogenated block copolymer (a-1-2)/content of block mainly comprising vinyl aromatic monomer unit) in the partially hydrogenated block copolymer (a-1) was 1.5.

(Partially Hydrogenated Block Copolymer P3)

A polymer was obtained in the same manner as in the method for producing partially hydrogenated block copolymer P1 except that the ratio of a butadiene monomer and a styrene monomer was changed; a mixture, which contained a modified (diglycidyl-etherified) product of 2,2-bis(4-hydroxyphenyl)propane with epichlorohydrin and a modified (diglycidyl-etherified) product of a phenol-formaldehyde polycondensate with epichlorohydrin in a weight ratio of 1/1, was added as a coupling agent; and the coupling rate of P1 was changed.

In this manner, a polymer solution containing a polystyrene-block-polybutadiene-block-polystyrene (a-1-1 structure) and a polystyrene-block-polybutadiene (a-1-2 structure) in a mass ratio=50 mass %/50 mass % was obtained. The content of a vinyl aromatic monomer unit (polystyrene unit) and the content of a block (polystyrene block) mainly comprising a vinyl aromatic monomer unit in the obtained block copolymer were both 17 mass %. The double-bond amount (content of vinyl in butadiene) in a conjugated diene monomer unit was 40 mol %. The Mw of the copolymer having a-1-2 structure was 120000 and the Mw of the copolymer coupled and having a-1-1 structure was 240000.

Thereafter, the obtained coupling polymer was hydrogenated by use of the aforementioned hydrogenation catalyst at 80° C. to obtain a partially hydrogenated block copolymer. After completion of the reaction, a stabilizer (octadecyl-3-(3,5-di-t-butyl-4-hydroxyphenyl)propionate) was added in an amount of 0.25 parts by mass to the partially hydrogenated block copolymer (100 parts by mass) to obtain a partially hydrogenated block copolymer P3. The hydrogenation ratio of partially hydrogenated block copolymer P3 was 58 mol % and MFR (200° C., 5 kgf) thereof was 3.0 g/10 minutes.

The ratio (content of partially hydrogenated block copolymer (a-1-2)/the content of the vinyl aromatic monomer unit) in the partially hydrogenated block copolymer (a-1) was 3.9; whereas the ratio (content of partially hydrogenated block copolymer (a-1-2)/the content of block mainly comprising vinyl aromatic monomer unit) in the partially hydrogenated block copolymer (a-1) was 2.9.

(Partially Hydrogenated Block Copolymer P4)

A polymer solution containing the polystyrene-block-polybutadiene-block-polystyrene (a-1-1 structure) and the polystyrene-block-polybutadiene (a-1-2 structure) in a mass ratio=50 mass %/50 mass % was obtained in the same manner as in the method for producing partially hydrogenated block copolymer P3 except that the ratio of styrene and butadiene was changed. The content of a vinyl aromatic monomer unit (polystyrene unit) and the content of a block (polystyrene block) mainly comprising a vinyl aromatic monomer unit in the obtained block copolymer, were both 20 mass %. The double-bond amount (content of vinyl in butadiene) in a conjugated diene monomer unit was 40 mol %. The Mw of the copolymer having a-1-2 structure was 120000 and the Mw of the copolymer coupled and having a-1-1 structure was 240000.

Thereafter, hydrogenation was performed in the same manner as in the production method of partially hydrogenated block copolymer P1 and a stabilizer was added to produce partially hydrogenated block copolymer P4. The hydrogenation ratio of partially hydrogenated block copolymer P4 was 58 mol % and MFR (200° C., 5 kgf) was 2.0 g/10 minutes.

The ratio (content of partially hydrogenated block copolymer (a-1-2)/the content of the vinyl aromatic monomer unit) in the partially hydrogenated block copolymer (a-1) was 2.5; whereas the ratio (content of partially hydrogenated block copolymer (a-1-2)/the content of block mainly comprising vinyl aromatic monomer unit) in the partially hydrogenated block copolymer (a-1) was 2.5.

(Partially Hydrogenated Block Copolymer Composition P5)

A tank reactor with a jacket was charged with a predetermined amount of cyclohexane and the interior temperature of the reactor was adjusted to 60° C. Thereafter, n-butyl lithium was supplied from the bottom of the reactor so as to obtain 0.11 parts by mass based on the total amount (100 parts by mass) of monomers (total amount of a butadiene monomer and a styrene monomer to be loaded to the reactor). Further, a cyclohexane solution of N,N,N',N'-tetramethylethylenediamine was added in an amount of 0.35 mol based on n-butyl lithium (1 mol). Thereafter, a cyclohexane solution (monomer concentration: 15 mass %) containing styrene (15 parts by mass), which was a monomer for use in a first step polymerization reaction, was supplied over about 10 minutes and the interior temperature of the reactor was adjusted to 60° C. After termination of the supply, the reaction was allowed to proceed for 15 minutes while controlling the interior temperature of the reactor at 70° C.

Subsequently, a cyclohexane solution (monomer concentration: 15 mass %) containing butadiene (85 parts by mass), for use in a second step polymerization reaction was supplied over 50 minutes continuously at a constant speed to the reactor while controlling the interior temperature of the reactor to be 70° C. After termination of the supply, the reaction was allowed to proceed for 10 minutes while controlling the interior temperature of the reactor at 70° C. to obtain a polystyrene-polybutadiene block copolymer. In the obtained polystyrene-polybutadiene block copolymer, the content of a vinyl aromatic monomer unit (polystyrene unit) and the content of a block (polystyrene block) mainly comprising a vinyl aromatic monomer unit were both 15 mass % and the amount of double-bond (content of vinyl in butadiene) in a conjugated diene monomer unit was 35 mol %, and Mw was 95000.

The polystyrene-polybutadiene block copolymer was partly sampled. To this, a coupling agent, tetraethoxysilane, was added in a molar ratio of 0.5 based on the total molar number of n-butyl lithium. The reaction mixture was subjected to a coupling reaction for 20 minutes, and then, the coupling reaction was terminated. The resultant solution and a solution which was not subjected to a coupling reaction were mixed to obtain a composition. The composition had the following composition.

(Composition)
Copolymer with a-1-2 structure
(S—B): 60 mass %, Mw 95000
Copolymer with a-1-1 structure
$(S—B)_2$—X: 32 mass %, Mw 190000
$(S—B)_3$—X: 4 mass %, Mw 285000
$(S—B)_4$—X: 4 mass %, Mw 380000

In the formulas, S represents a styrene block; B represents a butadiene block; and X represents a residue of a coupling agent. The same applies to the followings.

Thereafter, the obtained coupling polymer was hydrogenated by use of the aforementioned hydrogenation catalyst at 80° C. to obtain a partially hydrogenated block copolymer. After completion of the reaction, a stabilizer (octadecyl-3-(3,5-di-t-butyl-4-hydroxyphenyl)propionate) was added in an amount of 0.25 parts by mass to the partially hydrogenated block copolymer (100 parts by mass) to obtain a partially hydrogenated block copolymer P5. The hydrogenation ratio of partially hydrogenated block copolymer P5 was 45 mol % and MFR (200° C., 5 kgf) thereof was 4.5 g/10 minutes.

The ratio (content of partially hydrogenated block copolymer (a-1-2)/the content of the vinyl aromatic monomer unit) in the partially hydrogenated block copolymer (a-1) was 4.0; whereas the ratio (content of partially hydrogenated block copolymer (a-1-2)/the content of block mainly comprising vinyl aromatic monomer unit) in the partially hydrogenated block copolymer (a-1) was 4.0.

(Partially Hydrogenated Block Copolymer Composition P6)

A composition having the following composition was obtained by carrying out a polymerization reaction and a coupling reaction in the same manner as in the case of obtaining partially hydrogenated block copolymer composition P5 except that a coupling agent, i.e., silicon tetrachloride, was added in a molar ratio of 0.25 based on the total molar number of n-butyl lithium.

(Composition)
Copolymer with a-1-2 structure
(S—B): 60 mass %, Mw 95000
Copolymer with a-1-1 structure
$(S—B)_2$—X: 3 mass %, Mw 190000
$(S—B)_3$—X: 0 mass %, Mw 285000
$(S—B)_4$—X: 37 mass %, Mw 380000

The content of a vinyl aromatic monomer unit (polystyrene unit): 15 mass % and the content of a block mainly comprising a vinyl aromatic monomer unit (polystyrene block): 15 mass %.

The double bond amount (vinyl content in butadiene) in a conjugated diene monomer unit: 35 mol %.

Partially hydrogenated block copolymer P6 was obtained by carrying out a hydrogenation reaction in the same manner as in partially hydrogenated block copolymer composition P5. The hydrogenation ratio of partially hydrogenated block copolymer P6 was 45 mol % and MFR (200° C., 5 kgf) thereof was 2.5 g/10 minutes.

The ratio (the content of partially hydrogenated block copolymer (a-1-2)/the content of the vinyl aromatic monomer unit) in the partially hydrogenated block copolymer (a-1) was 4.0; and the ratio (the content of partially hydrogenated block copolymer (a-1-2)/the content of block mainly comprising vinyl aromatic monomer unit) in the partially hydrogenated block copolymer (a-1) was 4.0.

(Partially Hydrogenated Block Copolymer Composition P7)

A composition having the following composition was obtained by carrying out a polymerization reaction and a coupling reaction in the same manner as in the case of partially hydrogenated block copolymer composition P5 except that the amount of polystyrene-polybutadiene block copolymer sampled was changed.

(Composition)
Copolymer with a-1-2 structure
(S—B): 40 mass %, Mw 95000
Copolymer with a-1-1 structure
$(S—B)_2$—X: 48 mass %, Mw 190000
$(S—B)_3$—X: 6 mass %, Mw 285000
$(S—B)_4$—X: 6 mass %, Mw 380000

The content of a vinyl aromatic monomer unit (polystyrene unit): 15 mass % and the content of a block mainly comprising a vinyl aromatic monomer unit (polystyrene block): 15 mass %.

The double bond amount (vinyl content in butadiene) in a conjugated diene monomer unit: 35 mol %.

Partially hydrogenated block copolymer P7 was obtained by carrying out a hydrogenation reaction in the same manner as in partially hydrogenated block copolymer composition P5. The hydrogenation ratio of partially hydrogenated block copolymer P7 was 43 mol % and MFR (200° C., 5 kgf) thereof was 3.5 g/10 minutes.

The ratio (the content of partially hydrogenated block copolymer (a-1-2)/the content of the vinyl aromatic monomer unit) in the partially hydrogenated block copolymer (a-1) was 2.7; and the ratio (the content of partially hydrogenated block copolymer (a-1-2)/the content of block mainly comprising vinyl aromatic monomer unit) in the partially hydrogenated block copolymer (a-1) was 2.7.

(Partially Hydrogenated Block Copolymer Composition P8)

A composition having the following composition was obtained by carrying out a polymerization reaction and a coupling reaction in the same manner as in the case of partially hydrogenated block copolymer composition P6 except that the amount of polystyrene-polybutadiene block copolymer sampled was changed.
(Composition)
　　Copolymer with a-1-2 structure
　　　　(S—B): 40 mass %, Mw 95000
　　Copolymer with a-1-1 structure
　　　　(S—B)$_2$—X: 5 mass %, Mw 190000
　　　　(S—B)$_3$—X: 0 mass %, Mw 285000
　　　　(S—B)$_4$—X: 65 mass %, Mw 380000
　　The content of a vinyl aromatic monomer unit (polystyrene unit): 15 mass % and the content of a block mainly comprising a vinyl aromatic monomer unit (polystyrene block): 15 mass %.
　　The double bond amount (vinyl content in butadiene) in a conjugated diene monomer unit: 35 mol %.
　　Partially hydrogenated block copolymer P8 was obtained by carrying out a hydrogenation reaction in the same manner as in partially hydrogenated block copolymer composition P6. The hydrogenation ratio of partially hydrogenated block copolymer P8 was 40 mol % and MFR (200° C., 5 kgf) thereof was 1.5 g/10 minutes.
　　The ratio (the content of partially hydrogenated block copolymer (a-1-2)/the content of the vinyl aromatic monomer unit) in the partially hydrogenated block copolymer (a-1) was 2.7; and the ratio (the content of partially hydrogenated block copolymer (a-1-2)/the content of block mainly comprising vinyl aromatic monomer unit) in the partially hydrogenated block copolymer (a-1) was 2.7.
(Partially Hydrogenated Block Copolymer Composition P9)
　　A composition having the following composition was obtained by carrying out a polymerization reaction and a coupling reaction in the same manner as in the case of partially hydrogenated block copolymer composition P5 except that methyl trichlorosilane was added as a coupling agent, in a molar ratio of 0.33 based on the total molar number of n-butyl lithium.
(Composition)
　　Copolymer with a-1-2 structure
　　　　(S—B): 40 mass %, Mw 95000
　　Copolymer with a-1-1 structure
　　　　(S—B)$_2$—X: 3 mass %, Mw 190000
　　　　(S—B)$_3$—X: 57 mass %, Mw 285000
　　　　(S—B)$_4$—X: 0 mass %, Mw 380000
　　The content of a vinyl aromatic monomer unit (polystyrene unit): 15 mass % and the content of a block mainly comprising a vinyl aromatic monomer unit (polystyrene block): 15 mass %.
　　The double bond amount (vinyl content in butadiene) in a conjugated diene monomer unit: 35 mol %.
　　Partially hydrogenated block copolymer P9 was obtained by carrying out a hydrogenation reaction in the same manner as in partially hydrogenated block copolymer composition P5. The hydrogenation ratio of partially hydrogenated block copolymer P9 was 45 mol % and MFR (200° C., 5 kgf) thereof was 3.5 g/10 minutes.
　　The ratio (the content of partially hydrogenated block copolymer (a-1-2)/the content of the vinyl aromatic monomer unit) in the partially hydrogenated block copolymer (a-1) was 2.7; and the ratio (the content of partially hydrogenated block copolymer (a-1-2)/the content of block mainly comprising vinyl aromatic monomer unit) in the partially hydrogenated block copolymer (a-1) was 2.7.
(Partially Hydrogenated Block Copolymer Composition P10)
　　A composition having the following composition was obtained by carrying out a polymerization reaction and a coupling reaction in the same manner as in the case of partially hydrogenated block copolymer composition P5 except that tetraglycidyl-1,3-bisaminomethylcyclohexane was used as the coupling agent.
(Composition)
　　Copolymer with a-1-2 structure
　　　　(S—B): 60 mass %, Mw 95000
　　Copolymer with a-1-1 structure
　　　　(S—B)$_2$—X: 32 mass %, Mw 190000
　　　　(S—B)$_3$—X: 4 mass %, Mw 285000
　　　　(S—B)$_4$—X: 4 mass %, Mw 380000
　　The content of a vinyl aromatic monomer unit (polystyrene unit): 15 mass % and the content of a block mainly comprising a vinyl aromatic monomer unit (polystyrene block): 15 mass %.
　　The double bond amount (vinyl content in butadiene) in a conjugated diene monomer unit: 35 mol %.
　　Partially hydrogenated block copolymer P10 was obtained by carrying out a hydrogenation reaction in the same manner as in partially hydrogenated block copolymer composition P5. The hydrogenation ratio of partially hydrogenated block copolymer P10 was 47 mol % and MFR (200° C., 5 kgf) thereof was 4.5 g/10 minutes.
　　The ratio (content of partially hydrogenated block copolymer (a-1-2)/content of vinyl aromatic monomer unit) in a partially hydrogenated block copolymer (a-1) was 4.0; and the ratio (content of partially hydrogenated block copolymer (a-1-2)/content of block mainly comprising vinyl aromatic monomer unit) in the partially hydrogenated block copolymer (a-1) was 4.0.
　　In the following Examples, other than the above partially hydrogenated block copolymer compositions P1 to 10, the following polymers were used.
　　(SIS)D1161 (trade name, manufactured by Kraton, polystyrene block content: 15 mass %, di-block content: 19 mass %)
　　(SBS)D1102 (trade name, manufactured by Kraton, polystyrene block content: 29 mass %, di-block content: 17 mass %)
　　(SEBS)D1161 (trade name, manufactured by Asahi Kasei Corporation, polystyrene block content: 18 mass %, di-block content: 0 mass %)
(Adhesive Composition)
　　A block copolymer (a), a tackifier (b) and an oil (c) according to the composition shown in Table 1 and an antioxidant (1 part by mass) based on 100 parts by mass of the block copolymer (a) were mixed by a kneader while heating to 150° C. to obtain adhesive compositions, respectively.
<Tackifier (b)>
　　(b-1) (aliphatic-based tackifier): Quintone R100 (trade name, manufactured by ZEON CORPORATION, a polymer having C4 to C5 hydrocarbon fractions: 99% or more, softening point: 96° C.)
　　(b-2) (styrene oligomer-based tackifier): Piccolastic A75 (trade name, manufactured by Eastman Chemical Company, softening point: 75° C.)
　　(b-3) (α-methylstyrene-styrene copolymer-based tackifier): Plastolyn 290 (trade name, manufactured by Eastman Chemical Company, softening point 140° C.)
<Oil (c)>
　　Oil (c-1) (naphthenic oil): Diana Process Oil NS-90S (trade name, manufactured by Idemitsu Kosan Co., Ltd.)
　　Oil (c-2) (paraffinic oil): Diana Process Oil PW-90 (trade name, manufactured by Idemitsu Kosan Co., Ltd.)

<Antioxidant>

Antioxidant: Irganox1010 (trade name, manufactured by Ciba Specialty Chemicals)

(Method for Manufacturing Pressure-Sensitive Adhesive Tape)

An adhesive composition molten was cooled to room temperature, dissolved in toluene and applied to a polyester film of 50 µm in thickness by an applicator. Thereafter, toluene was completely removed by evaporation at room temperature for 30 minutes and in an oven of 70° C. for 7 minutes to prepare an adhesive tape of 50 µm in thickness.

<Evaluation Method>

A method of specifying the structures of the polymers obtained in Examples 1 to 34 and Comparative Examples 1 to 10 (described later) and evaluation method thereof will be described below.

(Vinyl Content and Hydrogenation Ratio)

The vinyl content of a partially hydrogenated block copolymer and the hydrogenation ratio of unsaturated groups of a conjugated diene were measured by nuclear magnetic resonance spectrum analysis (NMR) in the following conditions.

To the reaction solution before a hydrogenation reaction, a large amount of methanol was added to precipitate a block copolymer. Then, the block copolymer was recovered, extracted with acetone, vacuum-dried and supplied to 1H-NMR measurement as a sample to measure the content of vinyl.

To the reaction solution after the hydrogenation reaction, a large amount of methanol was added to precipitate a partially hydrogenated block copolymer. Then, the partially hydrogenated block copolymer was recovered, extracted with acetone, vacuum-dried and supplied to 1H-NMR measurement as a sample to measure a hydrogenation ratio thereof.

Measurement conditions of 1H-NMR will be described below.

(Measurement Conditions)

Measuring instrument: JNM-LA400 (manufactured by JEOL)

Solvent: deuterated chloroform

Measurement sample: polymer sample taken before and after hydrogenation

Sample concentration: 50 mg/mL

Observation frequency: 400 MHz

Chemical shift reference: TMS (tetramethylsilane)

Pulse delay: 2.904 seconds

The number of scans: 64 times

Pulse width: 45°

Measured temperature: 26° C.

(Content of Vinyl Aromatic Monomer Unit (Styrene))

A predetermined amount of a block copolymer composition was dissolved in chloroform. The peak intensity of an absorption wavelength (262 nm) due to the vinyl aromatic compound component (styrene) of a solution was measured by as ultraviolet spectrophotometer (UV-2450, manufactured by Shimadzu Corporation). The content of the vinyl aromatic monomer unit (styrene) was calculated from the obtained peak intensity based on a calibration curve.

(Content of Polymer Block Mainly Comprising Vinyl Aromatic Monomer Unit)

The content of a polymer block mainly comprising a vinyl aromatic monomer unit was measured by the osmium tetroxide oxidation method described in I. M. Kolthoff, et. al., J. Polym. Sci., 1946, Vol. 1, p. 429, using the following polymer decomposition solution.

(Measurement Condition)

Measurement sample: polymer sample taken before hydrogenation

Polymer decomposition solution: solution having osmium acid (0.1 g) dissolved in tertiary butanol (125 mL)

<Weight-Average Molecular Weight (Mw) of Partially Hydrogenated Block Copolymer>

The weight-average molecular weight of a partially hydrogenated block copolymer was obtained based on the molecular weight of a peak in a chromatogram using a calibration curve obtained based on measurement of commercially available standard polystyrene (prepared by use of the peak molecular weight of standard polystyrene). As the measurement software, HLC-8320EcoSEC collection was used. As the analysis software, HLC-8320 analysis was used.

(Measurement Conditions)

GPC: HLC-8320GPC (manufactured by TOSOH CORPORATION)

Detector: RI

Detection sensitivity: 3 mV/minute

Sampling pitch: 600 msec

Column: 4 columns of TSKgel super HZM-N (6 mm I.D.×15 cm) (manufactured by TOSOH CORPORATION)

Solvent: THF

Flow rate: 0.6 mm/minute

Concentration: 0.5 mg/mL

Column temperature: 40° C.

Injection volume: 20 µL

<The Content (by Mass) of Partially Hydrogenated Block Copolymer (a-1-1) and Partially Hydrogenated Block Copolymer (a-1-2)>

The area ratio of a peak at the lowest molecular weight based on the total peak area of the elution curve obtained by the aforementioned measurement was obtained and specified as the content of a partially hydrogenated block copolymer (a-1-2). The area ratio of a peak at a molecular weight, which was higher than that of a partially hydrogenated block copolymer (a-1-2) based on the total peak area of the elution curve obtained by the aforementioned measurement, was obtained and specified as the content of a partially hydrogenated block copolymer (a-1-1). Note that, the area ratio was obtained by vertical partitioning at an inflection point in the curve between peaks using HLC-8320 analysis as analysis software.

(Adhesive Properties: Ball Tack, Tack Strength, Retentivity)

(Ball Tack)

An adhesive tape of 10 cm in length was attached onto an inclined surface on a glass plate having an inclination angle of 30 degrees with the sticky surface turned up, in accordance with J. Dow [Proc. Inst. Rub. Ind., 1.105 (1954)]. From a position on the inclined surface at a distance of 10 cm upward from the top end of the tape, 32 types of stainless steel balls having a diameter of $\frac{1}{32}$ inches to 1 inch were allowed to roll at an initial velocity of 0. The largest diameter of the ball stopped on the adhesive tape was measured. Ball tack was evaluated based on the size (diameter) of a ball in accordance with the following evaluation criteria. Scores 5, 4, 3, 2, 1 were given in the order of high evaluation to low evaluation. If the score was 3 or more, the adhesive composition can be used without a practical problem.

$\frac{23}{32}$ inches<ball size: 5

$\frac{19}{32}$ inches<ball size≤$\frac{23}{32}$ inches: 4

$\frac{7}{32}$ inches<ball size≤$\frac{19}{32}$ inches: 3

$\frac{4}{32}$ inches<ball size≤$\frac{7}{32}$ inches: 2 ball size≤$\frac{4}{32}$ inches: 1

(Tack Strength)

In accordance with peel tack strength measurement method 1 of JIS 20237: a measurement method for 180° peel tack strength against a test plate, a sample of 15 mm in width was attached to a stainless plate and 180° peel force at a peel speed of 300 mm/min was measured. The tack strength of adhesive compositions was evaluated based on the obtained peel force in accordance with the following criteria. Scores 6, 5, 4, 3, 2, 1 were given in the order of high evaluation to low evaluation. If the score was 3 or more, the adhesive composition can be used without a practical problem.

10.0<peel force (N/10 mm): 6
8.0<peel force (N/10 mm)≤10.0: 5
6.5<peel force (N/10 mm)≤8.0: 4
4.0<peel force (N/10 mm)≤6.5: 3
2.5<peel force (N/10 mm)≤4.0: 2
peel force (N/10 mm)≤2.5: 1

(Retentivity)

Retentivity was evaluated by attaching adhesive tape samples to a stainless plate such that an area of 25 mm×25 mm was in contact with each other, applying a load of 1 kg at 60° C. and measuring time until the adhesive tape slipped down. The retentivity of adhesive compositions was evaluated based on the time obtained in accordance with the following criteria. Scores 6, 5, 4, 3, 2, 1 were given in the order of high evaluation to low evaluation. If the score was 3 or more, the adhesive composition can be used without a practical problem.

400<Retentivity (minutes): 6
200<retentivity (minutes)≤400: 5
100<retentivity (minutes)≤200: 4
75<retentivity (minutes)≤100: 3
50<retentivity (minutes)≤75: 2
Retentivity (minutes)≤50: 1

If the adhesive composition has a ball tack score of 3 or more, a tack strength score of 5 or more and a retentivity score of 6 or more, the composition can be preferably used for a tape. If the adhesive composition has a ball tack score of 5 or more, a tack strength score of 3 or more and a retentivity score of 3 or more, the composition can be preferably used for a label.

(Coating Property (160° C.))

The adhesive composition molten was dropped on a PET film having a thickness of 50 μm and attached onto a hot plate heated to 160° C., and the thickness of the adhesive composition was controlled to be 50 μm by use of an applicator heated to 160° C. by controlling the space between the hot plate and an applicator. The adhesive composition was applied at a speed of about 100 mm/sec., and thereafter, the unevenness of the adhesive composition coating surface was visually observed. The coating property of adhesive compositions was evaluated based on the area of unevenness based on the coating area and in accordance with the following criteria. Scores 4, 3, 2, 1 were given in the order of high evaluation to low evaluation.

4: Unevenness was present in less than 3 area %
3: Unevenness was present in 3 area % or more and less than 10 area %
2: Unevenness was present in 10 area % or more and less than 40 area %
1: Unevenness was present in 40 area % or more (Coating Property (150° C.))

The adhesive composition molten was dropped on a PET film having a thickness of 50 μm and attached onto a hot plate heated to 150° C., and the thickness of the adhesive composition was controlled to be 50 μm by use of an applicator heated to 150° C. by controlling the space between the hot plate and an applicator. The adhesive composition was applied at a speed of about 100 mm/sec. Thereafter the unevenness of an adhesive composition coating surface was visually observed. The coating property of adhesive compositions was evaluated based on the area of unevenness based on the coating area and in accordance with the following criteria. Scores 3, 2, 1 were given in the order of high evaluation to low evaluation.

Evaluation Criteria

3: Unevenness was present in less than 10 area %
2: Unevenness was present in 10 area % or more and less than 40 area %
1: Unevenness was present in 40 area % or more (Coloring Resistance During Processing)

The resultant adhesive compositions were each molded into a sheet and heated in a Geer oven at 150° C. for 300 minutes. Thereafter, the b value of the obtained sheet was measured by a color-difference meter (ZE-2000, manufactured by NIPPON DENSHOKU INDUSTRIES Co., Ltd.) and evaluated based on the following criteria. Scores 3, 2, 1 were given in the order of high evaluation to low evaluation.

b value≤3: 3
3<b value≤6: 2
6<b value: 1

(High Runoff Resistance from Edge)

Pressure-sensitive adhesive tapes were stacked to obtain a 10-layer laminate. To this, a load of 30 g/cm² was applied at 25° C. and 3 days later, runoff from the edges was visually observed. Scores 3, 2, 1 were given in the order of high evaluation to low evaluation.

3: No runoff
2: Runoff was observed in less than 30% of edge
1: Runoff was observed in 30% or more of edge (180° C. Melt Viscosity Of Adhesive Composition)

The melt viscosity of the adhesive compositions was measured at a temperature of 180° C. by a Brookfield viscometer (DV-III, manufactured by Brookfield).

(Storage Rigidity Modulus (G') of Adhesive Composition)

Dynamic viscoelastic spectrum was measured by the following method to obtain a storage rigidity modulus. Measurement was performed by using an apparatus ARES (trade name, manufactured by TA instrument Japan) in the conditions: twist type geometry (8 mm parallel plate), a gap of 2 mm to 1.5 mm, an auto tension from strain (initial strain) of 0.05% up to 10%, a frequency of 1 Hz, a measurement range from −100° C. to 100° C., and a temperature raising rate of 3° C./minute.

Examples 1 to 34> <Comparative Examples 1 to 10>

Evaluation results of the adhesive compositions of Examples 1 to 34 and Comparative Examples 1 to 11 are shown in Tables 1 to 4 respectively. From following Tables 1 to 4, it was found that adhesive compositions of the present invention keep a balance between high ball tack, high tack strength, high retentivity, high coating property, color fastness, high runoff resistance from the edge of a tape laminate.

TABLE 1

| | Label | | \multicolumn{10}{c}{Example} |
| | | | 1 | 2 | 3 | 4 | 5 | 6 | 7 | 8 | 9 | 10 |
|---|---|---|---|---|---|---|---|---|---|---|---|---|
| Composition | Content (P) of partially hydrogenated block copolymer | parts by mass | 100 | 100 | 100 | 100 | 100 | 100 | 100 | 100 | 100 | 100 |
| | Type of partially hydrogenated block copolymer | | P1 | P1 | P1 | P1 | P1 | P3 | P3 | P3 | P3 | P3 |
| | Content of tackifier (T) | parts by mass | 140 | 180 | 165 | 175 | 155 | 200 | 167 | 140 | 225 | 180 |
| | Type of tackifier | | b-1 | b-1 | b-1 | b-1 | b-1 | b-1 | b-1 | b-1 | b-1 | b-1 |
| | Content of oil c-1 (O) | parts by mass | 30 | 35.3 | 52 | 40 | 19 | 100 | 67 | 130 | 58 | 58 |
| | (P)/(O) ratio | | 3.3 | 2.8 | 1.9 | 2.5 | 5.3 | 1.00 | 1.49 | 0.77 | 1.72 | 1.72 |
| | (T)/(O) ratio | | 4.7 | 5.1 | 3.2 | 4.4 | 8.2 | 2.00 | 2.49 | 1.08 | 3.88 | 3.10 |
| Viscosity and viscoelasticity | Melt viscosity | mPa·s | 45,000 | 25,000 | 30,000 | 28,000 | 55,000 | 7,500 | 8,500 | 6,500 | 5,500 | 7,000 |
| | G' at 0° C. | ×10$^6$ Pa | 0.5 | 0.7 | 0.6 | 0.7 | 0.5 | 0.15 | 0.16 | 0.12 | 0.18 | 0.17 |
| | G'(0° C.)/G'(30° C.) | | 3 | 5 | 4 | 4 | 4 | 2 | 3 | 2 | 20 | 3 |
| Evaluation results | Ball tack | | 3 | 3 | 4 | 3 | 3 | 5 | 5 | 5 | 5 | 5 |
| | Tack strength | | 5 | 6 | 5 | 6 | 6 | 4 | 4 | 3 | 4 | 4 |
| | Retentivity | | 6 | 6 | 6 | 6 | 6 | 4 | 5 | 3 | 4 | 3 |
| | Coating property (160° C.) | | 3 | 4 | 4 | 4 | 3 | 3 | 3 | 3 | 4 | 4 |
| | Coating property (150° C.) | | 3 | 3 | 3 | 3 | 3 | 3 | 3 | 3 | 3 | 3 |
| | Color fastness during processing | | 3 | 3 | 3 | 3 | 2 | 3 | 3 | 3 | 2 | 3 |
| | Runoff from edge | | 3 | 3 | 3 | 3 | 3 | 3 | 3 | 3 | 3 | 3 |

TABLE 2

| | Label | | \multicolumn{10}{c}{Comparative Example} |
| | | | 1 | 2 | 3 | 4 | 5 | 6 | 7 | 8 | 9 | 10 |
|---|---|---|---|---|---|---|---|---|---|---|---|---|
| Composition | Content (P) of partially hydrogenated block copolymer | parts by mass | 100 | 100 | 100 | 100 | 100 | 100 | 100 | 100 | 100 | 100 |
| | Type of partially hydrogenated block copolymer | | P1 | P1 | P1 | P1 | P2 | P3 | P3 | P3 | P3 | P4 |
| | Content of tackifier (T) | parts by mass | 145 | 100 | 100 | 250 | 140 | 250 | 200 | 100 | 50 | 200 |
| | Type of tackifier | | b-1 | b-1 | b-1 | b-1 | b-1 | b-1 | b-1 | b-1 | b-1 | b-1 |
| | Content of oil c-1 (O) | parts by mass | 15 | 15 | 50 | 100 | 30 | 60 | 160 | 53 | 60 | 100 |
| | (P)/(O) ratio | | 6.7 | 6.7 | 2.0 | 1.0 | 3.3 | 1.67 | 0.63 | 1.89 | 1.67 | 1.00 |
| | (T)/(O) ratio | | 9.7 | 6.7 | 2.0 | 2.5 | 4.7 | 4.17 | 1.25 | 1.89 | 0.83 | 2.00 |
| Viscosity and viscoelasticity | Melt viscosity | mPa·s | 95,000 | 150,000 | 110,000 | 3,000 | 105,000 | 5,000 | 800 | 120,000 | 180,000 | 950 |
| | G' at 0° C. | ×10$^6$ Pa | 2.20 | 1.20 | 1.10 | 1.20 | 2.30 | 3.10 | 0.10 | 0.20 | 0.40 | 2.05 |
| | G'(0° C.)/G'(30° C.) | | 6 | 5 | 4 | 101 | 5 | 120 | 1 | 1 | 5 | 4 |
| Evaluation results | Ball tack | | 2 | 1 | 4 | 5 | 1 | 2 | 2 | 5 | 2 | 2 |
| | Tack strength | | 6 | 4 | 3 | 6 | 5 | 3 | 3 | 3 | 1 | 3 |
| | Retentivity | | 6 | 6 | 6 | 4 | 6 | 3 | 1 | 4 | 4 | 4 |
| | Coating property (160° C.) | | 1 | 1 | 1 | 4 | 2 | 2 | 2 | 2 | 1 | 2 |
| | Coating property (150° C.) | | 1 | 1 | 1 | 3 | 2 | 3 | 3 | 1 | 1 | 2 |
| | Color fastness during processing | | 1 | 1 | 1 | 1 | 1 | 1 | 3 | 3 | 3 | 3 |
| | Runoff from edge | | 3 | 3 | 3 | 1 | 3 | 2 | 1 | 3 | 3 | 3 |

TABLE 3

| | Label | | \multicolumn{6}{c}{Example} |
| | | | 11 | 12 | 13 | 14 | 15 | 16 |
|---|---|---|---|---|---|---|---|---|
| Composition | Content of partially hydrogenated block copolymer | (parts by mass) | 100 | 70 | 70 | 70 | 100 | 100 |
| | Type of partially hydrogenated block copolymer | | P1 | P1 | P1 | P1 | P1 | P1 |
| | Content of SIS | (parts by mass) | | 30 | | | | |
| | Content of SBS | (parts by mass) | | | 30 | | | |
| | Content of SEBS | (parts by mass) | | | | 30 | | |
| | Content of tackifier b-1 | (parts by mass) | 140 | 140 | 140 | 140 | 100 | 100 |
| | Content of tackifier b-2 | (parts by mass) | | | | | 40 | 20 |
| | Content of tackifier b-3 | (parts by mass) | | | | | | 20 |
| | Content of softening agent c-1 | (parts by mass) | 20 | 30 | 30 | 30 | 30 | 30 |

TABLE 3-continued

|  |  |  |  |  |  |  |  |
|---|---|---|---|---|---|---|---|---|
|  | Content of softening agent c-2 | (parts by mass) | 10 | 10 | 10 | 10 | 10 | 10 |
|  | (P)/(O) ratio |  | 3.3 | 2.5 | 2.5 | 2.5 | 2.5 | 2.5 |
|  | (T)/(O) ratio |  | 4.7 | 3.5 | 3.5 | 3.5 | 3.5 | 3.5 |
| Viscosity | Melt viscosity | (mPa · s) | 35,000 | 32,000 | 35,000 | 35,000 | 30,000 | 29,000 |
| and visco- | G' at 0° C. |  | 0.52 | 0.4 | 0.5 | 0.5 | 0.6 | 0.6 |
| elasticity | G'(0° C.)/G'(30° C.) |  | 4 | 3 | 3 | 3 | 4 | 3 |
| Evaluation | Ball tack |  | 3 | 3 | 3 | 3 | 3 | 3 |
| results | Tack strength |  | 5 | 5 | 5 | 5 | 5 | 5 |
|  | Retentivity |  | 6 | 5 | 6 | 6 | 6 | 6 |
|  | Coating property (160° C.) |  | 3 | 3 | 3 | 3 | 4 | 4 |
|  | Coating property (150° C.) |  | 3 | 3 | 3 | 3 | 3 | 3 |
|  | Color fastness during processing |  | 3 | 3 | 3 | 3 | 3 | 3 |
|  | Runoff from edge |  | 3 | 3 | 3 | 3 | 3 | 3 |

|  |  |  | Example |  |  |  |  |  |
|---|---|---|---|---|---|---|---|---|
|  | Label |  | 17 | 18 | 19 | 20 | 21 | 22 |
| Compo- | Content of partially | (parts by mass) | 100 | 100 | 100 | 70 | 100 | 100 |
| sition | hydrogenated block copolymer |  |  |  |  |  |  |  |
|  | Type of partially hydrogenated block copolymer |  | P5 | P6 | P7 | P8 | P9 | P10 |
|  | Content of SIS | (parts by mass) |  |  |  | 30 |  |  |
|  | Content of SBS | (parts by mass) |  |  |  |  |  |  |
|  | Content of SEBS | (parts by mass) |  |  |  |  |  |  |
|  | Content of tackifier b-1 | (parts by mass) | 100 | 100 | 100 | 100 | 100 | 100 |
|  | Content of tackifier b-2 | (parts by mass) | 20 | 20 | 20 | 20 | 20 | 20 |
|  | Content of tackifier b-3 | (parts by mass) | 20 | 20 | 20 | 20 | 20 | 20 |
|  | Content of softening agent c-1 | (parts by mass) | 30 | 30 | 30 | 30 | 30 | 30 |
|  | Content of softening agent c-2 | (parts by mass) | 10 | 10 | 10 | 10 | 10 | 10 |
|  | (P)/(O) ratio |  | 2.5 | 2.5 | 2.5 | 2.5 | 2.5 | 2.5 |
|  | (T)/(O) ratio |  | 3.5 | 3.5 | 3.5 | 3.5 | 3.5 | 3.5 |
| Viscosity | Melt viscosity | (mPa · s) | 28,000 | 30,000 | 35,000 | 35,000 | 28,000 | 50,000 |
| and visco- | G' at 0° C. |  | 0.6 | 0.6 | 0.6 | 0.6 | 0.6 | 0.6 |
| elasticity | G'(0° C.)/G'(30° C.) |  | 3 | 3 | 3 | 3 | 3 | 3 |
| Evaluation | Ball tack |  | 4 | 4 | 3 | 3 | 3 | 4 |
| results | Tack strength |  | 5 | 5 | 5 | 5 | 5 | 6 |
|  | Retentivity |  | 5 | 6 | 6 | 6 | 6 | 6 |
|  | Coating property (160° C.) |  | 3 | 3 | 3 | 3 | 4 | 3 |
|  | Coating property (150° C.) |  | 3 | 3 | 3 | 3 | 3 | 3 |
|  | Color fastness during processing |  | 3 | 3 | 3 | 3 | 3 | 2 |
|  | Runoff from edge |  | 3 | 3 | 3 | 3 | 3 | 3 |

TABLE 4

|  |  |  | Example |  |  |  |  |  |
|---|---|---|---|---|---|---|---|---|
|  | Label |  | 23 | 24 | 25 | 26 | 27 | 28 |
| Compo- | Content of partially | (parts by mass) | 100 | 70 | 70 | 70 | 100 | 100 |
| sition | hydrogenated block copolymer |  |  |  |  |  |  |  |
|  | Type of partially hydrogenated block copolymer |  | P3 | P3 | P3 | P3 | P3 | P3 |
|  | Content of SIS | (parts by mass) |  | 30 |  |  |  |  |
|  | Content of SBS | (parts by mass) |  |  | 30 |  |  |  |
|  | Content of SEBS | (parts by mass) |  |  |  | 30 |  |  |
|  | Content of tackifier b-1 | (parts by mass) | 100 | 100 | 100 | 100 | 80 | 80 |
|  | Content of tackifier b-2 | (parts by mass) |  |  |  |  | 20 | 10 |
|  | Content of tackifier b-3 | (parts by mass) |  |  |  |  |  | 10 |
|  | Content of softening agent c-1 | (parts by mass) | 20 | 20 | 20 | 20 | 20 | 20 |
|  | Content of softening agent c-2 | (parts by mass) | 80 | 80 | 80 | 80 | 80 | 80 |
|  | (P)/(O) ratio |  | 1.0 | 1.0 | 1.0 | 1.0 | 1.0 | 1.0 |
|  | (T)/(O) ratio |  | 1.0 | 1.0 | 1.0 | 1.0 | 1.0 | 1.0 |
| Viscosity | Melt viscosity | (mPa · s) | 20,000 | 19,000 | 21,000 | 21,000 | 19,000 | 18,000 |
| and visco- | G' at 0° C. |  | 0.2 | 0.15 | 0.2 | 0.2 | 0.2 | 0.2 |
| elasticity | G'(0° C.)/G'(30° C.) |  | 1.5 | 1.5 | 1.7 | 2 | 2 | 1.5 |
| Evaluation | Ball tack |  | 5 | 5 | 5 | 5 | 5 | 5 |
| results | Tack strength |  | 4 | 4 | 4 | 4 | 4 | 4 |
|  | Retentivity |  | 4 | 3 | 4 | 4 | 4 | 4 |
|  | Coating property (160° C.) |  | 3 | 3 | 3 | 3 | 4 | 4 |
|  | Coating property (150° C.) |  | 3 | 3 | 3 | 3 | 3 | 3 |

TABLE 4-continued

|  |  |  | Example | | | | | |
|---|---|---|---|---|---|---|---|---|
|  |  |  | | | | | | |
|  | Color fastness during processing |  | 3 | 3 | 3 | 3 | 3 | 3 |
|  | Runoff from edge |  | 3 | 3 | 3 | 3 | 3 | 3 |

|  |  |  | Example | | | | | |
|---|---|---|---|---|---|---|---|---|
|  | Label |  | 29 | 30 | 31 | 32 | 33 | 34 |
| Composition | Content of partially hydrogenated block copolymer | (parts by mass) | 100 | 100 | 100 | 70 | 100 | 100 |
|  | Type of partially hydrogenated block copolymer |  | P5 | P6 | P7 | P8 | P9 | P10 |
|  | Content of SIS | (parts by mass) |  |  |  | 30 |  |  |
|  | Content of SBS | (parts by mass) |  |  |  |  |  |  |
|  | Content of SEBS | (parts by mass) |  |  |  |  |  |  |
|  | Content of tackifier b-1 | (parts by mass) | 80 | 80 | 80 | 80 | 80 | 80 |
|  | Content of tackifier b-2 | (parts by mass) | 10 | 10 | 10 | 10 | 10 | 10 |
|  | Content of tackifier b-3 | (parts by mass) | 10 | 10 | 10 | 10 | 10 | 10 |
|  | Content of softening agent c-1 | (parts by mass) | 20 | 20 | 20 | 20 | 20 | 20 |
|  | Content of softening agent c-2 | (parts by mass) | 80 | 80 | 80 | 80 | 80 | 80 |
|  | (P)/(O) ratio |  | 1.0 | 1.0 | 1.0 | 1.0 | 1.0 | 1.0 |
|  | (T)/(O) ratio |  | 1.0 | 1.0 | 1.0 | 1.0 | 1.0 | 1.0 |
| Viscosity and viscoelasticity | Melt viscosity | (mPa · s) | 16,000 | 18,000 | 20,000 | 20,000 | 18,000 | 25,000 |
|  | G' at 0° C. |  | 0.2 | 0.2 | 0.2 | 0.2 | 0.2 | 0.2 |
|  | G'(0° C.)/G'(30° C.) |  | 1.6 | 1.4 | 1.5 | 1.5 | 1.5 | 1.4 |
| Evaluation results | Ball tack |  | 6 | 6 | 5 | 5 | 5 | 6 |
|  | Tack strength |  | 4 | 4 | 4 | 4 | 4 | 4 |
|  | Retentivity |  | 3 | 4 | 4 | 4 | 4 | 5 |
|  | Coating property (160° C.) |  | 3 | 3 | 3 | 3 | 4 | 3 |
|  | Coating property (150° C.) |  | 3 | 3 | 3 | 3 | 3 | 3 |
|  | Color fastness during processing |  | 3 | 3 | 3 | 3 | 3 | 3 |
|  | Runoff from edge |  | 3 | 3 | 3 | 3 | 3 | 3 |

The present application was based on Japanese Patent Application No. 2014-010804 filed Jan. 23, 2014 with Japan Patent Office and Japanese Patent Application No. 2014-010805 filed Jan. 23, 2014 with Japan Patent Office, the contents of which are incorporated herein by reference.

INDUSTRIAL APPLICABILITY

The adhesive composition of the present invention has industrial applicability as various types of adhesive tapes/labels, pressure sensitive thin plates, pressure sensitive adhesive sheets, surface protective sheets/films, adhesives (attached to rear side) for fixing various lightweight plastic moldings, adhesives (attached to rear side) for fixing carpets, adhesives (attached to rear side) for fixing tiles, adhesives and sealants.

The invention claimed is:
1. An adhesive composition comprising
a block copolymer (a) having a block mainly comprising a vinyl aromatic monomer unit,
a tackifier (b) and
an oil (c),
wherein
the block copolymer (a) comprises a partially hydrogenated block copolymer (a-1);
the partially hydrogenated block copolymer (a-1) has a vinyl aromatic monomer unit and a conjugated diene monomer unit;
a content of the vinyl aromatic monomer unit is 10 mass % or more and 19 mass % or less based on 100 mass % of the partially hydrogenated block copolymer (a-1);
a hydrogenation ratio of double bonds contained in the conjugated diene monomer unit in the partially hydrogenated block copolymer (a-1) is 15 mol % or more and less than 80 mol % based on a total (amount) of double bonds before hydrogenation;
when a ratio (P/O), which is a ratio of a content (P) of the block copolymer (a) to a content (O) of the oil (c), is 0.7 or more and less than 1.8, a ratio (T/O), which is a ratio of a content (T) of the tackifier (b) to a content (O) of the oil (c), is 1.0 or more and 4.0 or less;
when the ratio (P/O), which is a ratio of a content (P) of the block copolymer (a) to a content (O) of the oil (c), is 1.8 or more and 6.0 or less, the ratio (T/O), which is a ratio of a content (T) of the tackifier (b) to a content (O) of the oil (c), is 2.1 or more and 8.2 or less;
a content of the tackifier (b) is 60 parts by mass or more and 240 parts by mass or less based on 100 parts by mass of the block copolymer (a);
a content of the oil (c) is 10 parts by mass or more and 140 parts by mass or less based on 100 parts by mass of the block copolymer (a);
the partially hydrogenated block copolymer (a-1) comprises,
a partially hydrogenated block copolymer (a-1-1), which consists of two or more blocks mainly comprising the vinyl aromatic monomer unit and one or more blocks mainly comprising the conjugated diene monomer unit,
a partially hydrogenated block copolymer (a-1-2), which consists of a single block mainly comprising the vinyl aromatic monomer unit and a single block mainly comprising the conjugated diene monomer unit;

a content of the partially hydrogenated block copolymer (a-1-2) in the partially hydrogenated block copolymer (a-1) is 30 mass % or more; and a weight-average molecular weight of the partially hydrogenated block copolymer (a-1-2) is smaller than a weight-average molecular weight of the partially hydrogenated block copolymer (a-1-1).

2. The adhesive composition according to claim 1, wherein the partially hydrogenated block copolymer (a-1) comprises a block mainly comprising a vinyl aromatic monomer unit, and a content of the block mainly comprising a vinyl aromatic monomer unit is 10 mass % or more and 19 mass % or less based on 100 mass % of the partially hydrogenated block copolymer (a-1).

3. The adhesive composition according to claim 1, wherein the ratio (P/O), which is a ratio of a content (P) of the block copolymer (a) to a content (O) of the oil (c), is 1.8 or more and 6.0 or less.

4. The adhesive composition according to claim 1, wherein the content of the oil (c) is 10 parts by mass or more and 55 parts by mass or less.

5. The adhesive composition according to claim 1, wherein the ratio (P/O), which is a ratio of a content (P) of the block copolymer (a) to a content (O) of the oil (c), is 0.7 or more and less than 1.8.

6. The adhesive composition according to claim 1, wherein the content of the oil (c) is 62 parts by mass or more and 140 parts by mass or less.

7. The adhesive composition according to claim 1, wherein the hydrogenation ratio of double bonds contained in the conjugated diene monomer unit in the partially hydrogenated block copolymer (a-1) is 31 mol % or more and 70 mol % or less based on the total (amount) of double bonds before hydrogenation.

8. The adhesive composition according to claim 1, wherein a ratio of a content of the partially hydrogenated block copolymer (a-1-2) to a content of a block mainly comprising a vinyl aromatic monomer unit, ((a content of partially hydrogenated block copolymer (a-1-2))/(a content of block mainly comprising vinyl aromatic monomer unit)), in the partially hydrogenated block copolymer (a-1) is 1.8 to 7.0.

9. The adhesive composition according to claim 1, wherein the content of the partially hydrogenated block copolymer (a-1-2) in the partially hydrogenated block copolymer (a-1) is 10 to 80 mass %.

10. The adhesive composition according to claim 1, wherein a ratio of a content of the partially hydrogenated block copolymer (a-1-2) to the content of the vinyl aromatic monomer unit in the partially hydrogenated block copolymer (a-1), (a content of partially hydrogenated block copolymer (a-1-2)/a content of vinyl aromatic monomer unit), is 1.8 to 6.0.

11. The adhesive composition according to claim 1, wherein the tackifier (b) comprises an aliphatic-based tackifier.

12. The adhesive composition according to claim 1, wherein the tackifier (b) comprises a tackifier having a softening point of 87° C. or more.

13. The adhesive composition according to claim 1, having a melt viscosity at 180° C. of 1000 mPa·s or more and 100000 mPa·s or less.

14. The adhesive composition according to claim 1, having a storage rigidity modulus G' (G'(0° C.)) at 0° C. (measurement condition: 1 Hz) being $2 \times 10^6$ Pa or less.

15. The adhesive composition according to claim 1, wherein a ratio of a storage rigidity modulus G' at 0° C. (G'(0° C.)) (measurement condition: 1 Hz) to a storage rigidity modulus G' at 30° C. (G'(30° C.)) (measurement condition: 1 Hz), ((G'(0° C.))/(G'(30° C.))), is less than 100.

16. The adhesive composition according to claim 1, wherein the block copolymer (a) has at least one functional group selected from the group consisting of a hydroxyl group, an acid anhydride group, an epoxy group, an amino group, an amide group, a silanol group and an alkoxysilane group.

17. A pressure-sensitive adhesive tape having the adhesive composition according to claim 1.

* * * * *